(12) United States Patent
Leibler et al.

(10) Patent No.: US 9,994,651 B2
(45) Date of Patent: *Jun. 12, 2018

(54) COMPOSITION OF CROSS-LINKED POLYMERS COMPRISING PENDING EXCHANGEABLE BONDS AND EXCHANGEABLE CROSS-LINKS, VIA ALDEHYDE-IMINE AND/OR IMINE-IMINE EXCHANGE REACTIONS, PREPARATION PROCESSES AND USE

(71) Applicant: ECOLE SUPERIEURE DE PHYSIQUE ET DE CHIMIE INDUSTRIELLES DE LA VILLE DE PARIS, Paris (FR)

(72) Inventors: Ludwik Leibler, Paris (FR); Renaud Nicolay, Verrieres-le-Buisson (FR); Max Rottger, Paris (FR)

(73) Assignee: ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/238,969

(22) Filed: Aug. 17, 2016

(65) Prior Publication Data

US 2017/0051082 A1    Feb. 23, 2017

(30) Foreign Application Priority Data

Aug. 17, 2015   (FR) ...................... 15 57767

(51) Int. Cl.
| | |
|---|---|
| *C08F 8/30* | (2006.01) |
| *C08F 220/18* | (2006.01) |
| *C08F 8/28* | (2006.01) |
| *C08K 5/07* | (2006.01) |
| *C09D 133/06* | (2006.01) |
| *C09D 133/12* | (2006.01) |

(52) U.S. Cl.
CPC ............... *C08F 8/30* (2013.01); *C08F 8/28* (2013.01); *C08F 220/18* (2013.01); *C08K 5/07* (2013.01); *C09D 133/062* (2013.01); *C09D 133/12* (2013.01)

(58) Field of Classification Search
CPC ........................................ C08F 8/30
USPC ........................................ 525/398
See application file for complete search history.

(56) References Cited

PUBLICATIONS

Bruno et al., "Use of Niobium(III) and Niobium(V) Compounds in Catalytic Imine Metathesis under Mild Conditions," Organometallics, vol. 19, No. 23, 2000 (Published on Web, Oct. 14, 2000), pp. 4672-4674.

Cantrell et al., "Catalytic C=N Bond Formation by Metal-Imide-Mediated Imine Metathesis," J. Am. Chem. Soc., vol. 120, No. 32, 1998, (published on Web Jul. 30, 1998) pp. 8035-8042.

Cantrell et al., "Transition-Metal-Catalyzed Imine Metathesis," Organometallics, vol. 16, No. 25, Dec. 9, 1997, pp. 5381-5383.

Chow et al., "Crystallization-driven Constitutional Changes of Dynamic Polymers in Response to neat/solution Conditions," Chem. Commun., 2007 (Published as Advanced Article on the web Oct. 4, 2007), pp. 4363-4365, XP-55243335A.

Crivello et al., "Some Selected Schiff-Based Exchange Reactions," Eighty-first Annual Meeting of the Indiana Academy of Science at the University of Notre Dame, Notre Dame, Indiana Oct. 7-9, 1965 as Paper No. 14 in the Chemistry Division, pp. 1-7, XP-55243688A.

French Preliminary Search Report, dated Jan. 22, 2016, for French Application No. 1557767.

Giuseppone et al., "Scandium(III) Catalysis of Transimination Reactions. Independent and Constitutionally Coupled Reversible Processes," J. Am. Chem. Soc., vol. 127, No. 15, 2005 (Published on Web Mar. 22, 2005), pp. 5528-5539.

He et al., "Direct Synthesis of Controlled-Structure Primary Amine-Based Methacrylic Polymers by Living Radical Polymerization," Macromolecules, vol. 40, No. 13, 2007 (Published on Web, May 23, 2007), pp. 4429-4438.

International Search Report and Written Opinion of the International Searching Authority (forms PCT/ISA/210, PCT/ISA/237 and PCT/ISA/220), dated Mar. 11, 2016, for International Application No. PCT/EP2016/069483.

Jackson et al., "The Formation of Core Cross-linked Star Polymer and Nanogel Assemblies Facilitated by the Formation of Dynamic Covalent Imine Bonds," Polym. Chem., vol. 2, Published Aug. 30, 2011, pp. 2500-2511, XP-55243327A.

Mather et al., "Michael Addition Reactions in Macromolecular Design for Emerging Technologies," Prog. Polym. Sci., vol. 31, 2006, pp. 487-531.

(Continued)

*Primary Examiner* — Terressa Boykin
(74) *Attorney, Agent, or Firm* — Birch, Stewart, Kolasch & Birch, LLP

(57) ABSTRACT

The object of the invention is a composition comprising (a) cross-linked polymers containing pending links and cross-links that are exchangeable by aldehyde-imine exchange reactions and/or by imine-imine exchange reactions, obtained by cross-linking of linear or branched polymers; and (b) free monofunctional aldehydes and/or free monofunctional Another object of the invention is preparation processes of such a composition and the uses of the composition.

Another object of the invention is compositions for cross-linking linear or branched polymers and their use to form a composition comprising cross-linked polymers containing pending links and cross-links that are exchangeable by aldehyde-imine exchange reactions and/or by imine-imine exchange reactions.

Finally, an object of the invention is the use of aldehyde to catalyze imine-imine metathesis reactions and imine-aldehyde exchange reactions.

26 Claims, 4 Drawing Sheets

(56) References Cited

PUBLICATIONS

McInnes et al., "Transition Metal Imide/organic Imine Metathesis Reactions: Unexpected Observations," Chem. Commun., 1998, Published Jan. 1, 1998, 1669-1670.

Meyer et al., "Zirconium-Mediated Imine Metathesis. Synthesis of 2,4-Diaza-1-zirconiacyclobutanes and the Mechanism of Their Reactions with Imines and Alkynes," J. Am. Chem. Soc., vol. 116, No. 6, 1994, pp. 2669-2670.

Taynton et al., "Heat- or Water-Driven Malleability in a Highly Recyclable Covalent Network Polymer," Advanced Materials, vol. 26, No. 23, Mar. 27, 2014, pp. 3938-3942, XP-55224390A.

Wang et al., "Metathesis Reactions of Tris(adamantylimido)methylrhenium and Aldehydes and Imines," Organometallics, vol. 18, No. 24, 1999 (Published on Web Nov. 22, 1999), pp. 5170-5175.

Zuckerman et al., "Zirconium-Mediated Metathesis of Imines: A Study of the Scope, Longevity, and Mechanism of a Complicated Catalytic System," J. Am. Chem. Soc., vol. 122, No. 5, Feb. 9, 2000 (Published on Web Jan. 25, 2000), pp. 751-761.

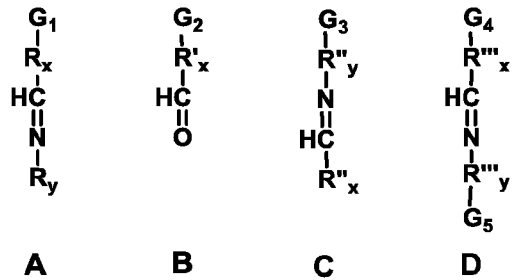
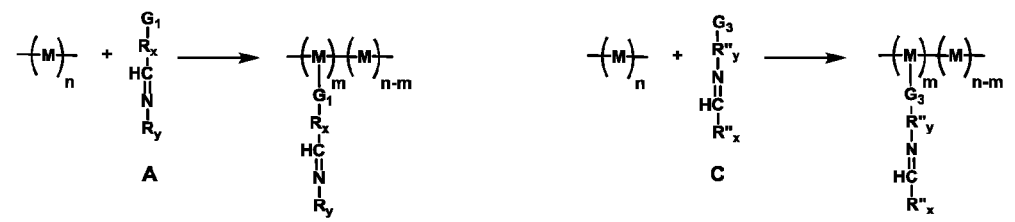
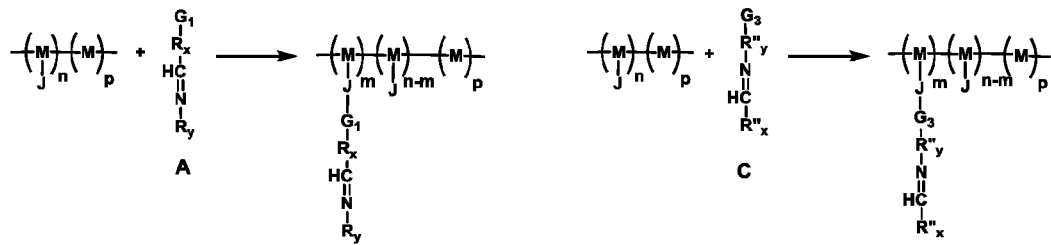
Fig. 1
Fig. 2
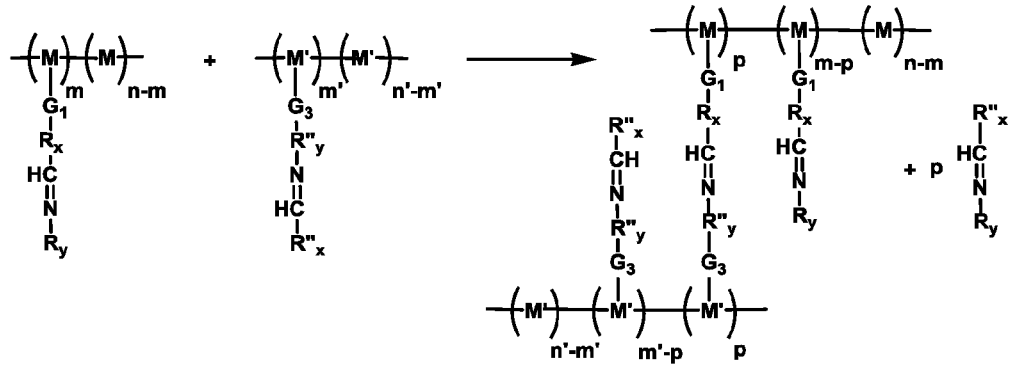
Fig. 3

COMPOSITION OF CROSS-LINKED POLYMERS COMPRISING PENDING EXCHANGEABLE BONDS AND EXCHANGEABLE CROSS-LINKS, VIA ALDEHYDE-IMINE AND/OR IMINE-IMINE EXCHANGE REACTIONS, PREPARATION PROCESSES AND USE

The invention relates to polymer compositions comprising cross-linked polymers comprising imine functions, and optionally aldehyde functions, enabling exchange reactions, as well as free monofunctional aldehydes and/or free monofunctional imines.

According to the invention, these compositions are preferably obtained from the modification of a polymer by a functionalised imine and/or aldehyde additive. This polymer can be pre-functionalised imine and/or aldehyde, depending on the case, or functionalised on addition of the said additive.

In particular, the invention relates to a process enabling the behaviour of a polymer to be modified by addition of a functional additive, enabling a cross-linked network containing exchangeable imine-imine and/or imine-aldehyde links to be formed.

According to the invention, the imine metathesis reaction enables an exchange reaction between the substituents carried by the imines:

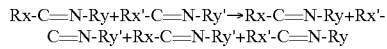
Rx-C=N-Ry+Rx'-C=N-Ry'→Rx-C=N-Ry+Rx'-C=N-Ry'+Rx-C=N-Ry'+Rx'-C=N-Ry

According to the invention, the imine-aldehyde exchange reaction enables an exchange reaction between the substituents carried by the imines and the aldehydes:

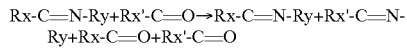
Rx-C=N-Ry+Rx'-C=O→Rx-C=N-Ry+Rx'-C=N-Ry+Rx-C=O+Rx'-C=O

"Exchange reaction" designates that organic molecules, oligomers, polymers or polymeric networks containing imine and/or aldehyde functions can exchange their substituents by an imine metathesis reaction or by an imine-aldehyde exchange reaction. These substituents can be hydrocarbon groups, oligomer chains or polymer chains. These groups are bound to the imine and aldehyde functions by covalent bonds through a carbon atom, before and after the exchange reaction. The imine metathesis reaction and the imine-aldehyde exchange reaction do not release a molecule of water and do not require the presence of water to take place. Notably, "exchange reaction" designates that the polymers of the invention can exchange among themselves the substituents of the imine and/or aldehyde functions that they carry by an imine metathesis reaction or by an imine-aldehyde exchange reaction. According to the invention, these functions can be pending or form part of the polymer chain, notably when they form part of a cross-link. Preferably these functions are pending or form part of a cross-link. In this way, the polymers are capable of exchanging chemical bonds among themselves.

The metathesis reaction can be carried out in the absence of catalyst or in the presence of a new catalyst for the imine metathesis reaction that is stable, easily available, inexpensive and non-toxic.

Various transition metals, e.g. Zr (R. G. Bergman et al., J. Am. Chem. Soc., 1994, 116, 2669.; R. G. Bergman et al., J. Am. Chem. Soc., 2000, 122, 751), Mo (T. Y. Meyer et al., Organometallics, 1997, 16, 5381; T. Y. Meyer et al., J. Am. Chem. Soc. 1998, 120, 8035), Ti (P. Mountford et al., Chem. Commun., 1998, 1669), Re (J. H. Espenson et al., Organometallics 1999, 18, 5170), Nb (J. W. Bruno et al., Organometallics 2000, 19, 4672) and lanthanide (Sc, Tb, Sm, La) salts (J.-M. Lehn, J. Am. Chem. Soc., 2005, 127, 5528) with triflate ions have been studied as catalysts for imine metathesis. However, as well as being generally toxic and expensive, these catalysts require several steps of synthesis to be prepared. The development of non-toxic organic catalysts that are easily available is therefore particularly interesting.

With this in mind, the possibility of using primary amines to catalyse the metathesis of imines through transamination reactions in solution has been studied. However, the inventors have noted that the use of primary amines to catalyse imine metathesis presents many problems, in particular if these reactions are to be carried out in organic polymer materials. Due to their reactivity and nucleophilic character, the primary amines lead to numerous parasite reactions, such as amidification reactions, in polymer materials containing carboxylic acid or ester groups. The primary amines may also react with other functions of interest. In addition to the aforementioned carboxylic acid and ester functions, epoxide, isocyanate and anhydride functions and halogenated derivatives may be mentioned, without this list being exhaustive. Furthermore, the parasite reactions caused by the presence of primary amines in organic polymer formulations occur increasingly as the polymers are subjected to higher temperatures, as is often the case during the cross-linking process, during use and/or shaping or during recycling. Furthermore, many vinylic monomers of interest, such as acrylates, methacrylates, acrylamides and methacrylic anhydride, are not stable in the presence of primary amines because of parasite reactions such as Michael addition and amidification. As an example, the publication "Direct Synthesis of Controlled-Structure Primary Amine-Based Methacrylic Polymers by Living Radical Polymerization" (authors: Lihong He, Elizabeth S. Read, Steven P. Armes, et Dave J. Adams, Macromolecules 2007, 40, 4429-4438; doi: 10.1021/ma070670q) describes the great instability of a methacrylate monomer carrying a primary amine function and the necessity to protect the primary amine function in the form of an ammonium salt to be able to polymerise the monomer. This article also discusses the degradation reactions of methacrylic polymers carrying primary amine functions by intramolecular and intermolecular amidification reactions. The review article "Michael addition reactions in macromolecular design for emerging technologies" (authors: Mather, B. D.; Viswanathan, K.; Miller K. M.; Long, T. E.; Prog. Polym. Sci. 31 (2006) 487-531, doi:10.1016/j.progpolymsci.2006.03.001) presents examples of Michael reactions between primary amines and various vinylic compounds. In this way, the presence of pending primary amines on organic polymers can lead to parasite reactions and limit the functional groups that can be incorporated into the materials and formulations as well as the nature of the monomers that can be used to prepare the polymers.

With this in mind, the inventors have developed cross-linked polymer compositions in which the cross-linking reactions and the exchange reactions do not involve primary amines and can take place in the absence of catalyst or in the presence of new imine metathesis catalysts: aldehydes. Unexpectedly, aldehyde-imine exchange reactions can also take place. These exchange reactions enable exchangeable polymers to be obtained.

"Exchangeable polymers" designates polymers that can exchange chemical bonds, hydrocarbon groups, oligomer chains or polymer chains by imine metathesis reactions or by imine-aldehyde exchange reactions.

These exchange reactions also enable polymer compositions to be obtained that show the properties of thermoset polymers and of thermoplastic polymers and which can be insoluble and malleable when hot.

By definition, a thermoset is a polymer that hardens following an input of energy, in particular on the action of heat. Thermosets are traditionally divided into two families depending on the glass-transition temperature (Tg) of their polymer matrix. Thermosets whose matrix has a Tg higher than the working temperature are called rigid thermosets, while thermosets whose matrix has a Tg lower than the working temperature are called elastomers. According to the present invention, thermoset designates both rigid thermosets and elastomers. Materials manufactured from thermoset polymers have the advantage of being able to be hardened in a way that gives them a high mechanical, thermal and chemical resistance, and for this reason they can replace metals in certain applications. They have the advantage of being lighter than metals. They can also be used as matrices in composite materials. Traditional thermosets must be manufactured; in particular they must be moulded and have the appropriate shape for their final use from the start. No transformation other than machining is possible once they are polymerised, and even machining is difficult because of their fragility. Supple and hard parts and composites based on thermoset resins cannot be transformed or shaped; nor can they be recycled. Thermoplastics belong to another class of polymeric materials. Thermoplastics can be shaped at high temperature by moulding or by injection, but have mechanical properties and thermal and chemical resistance that are less interesting than those of thermosets. In addition, the shaping of thermoplastics can often only be carried out in a very narrow temperature range. When thermoplastics are heated, they become liquids the fluidity of which varies abruptly around the melting/glass-transition temperatures, which does not allow the application of a range of transformation methods that exist for glass and for metals for example.

The new polymer compositions, including cross-linked polymers, can combine the mechanical properties and insolubility of a thermoset while being used like a thermoplastic. In this way, it is possible to develop polymer compositions that show the mechanical properties and insolubility of a thermoset but which can be transformed when hot after hardening. In particular, it is possible to develop materials that can be heated to temperatures at which they become liquid without suffering destruction or degradation of their structure. In addition, for environmental reasons, the polymer composition is preferably recyclable.

A process can be developed to enable the modification of polymer behaviour, notably thermoplastic behaviour, by cross-linking and the creation of exchangeable links. Advantageously, these modifications can be made to the polymer during operations to shape the said polymer, for example extrusion, injection or compression.

In this way, the object of the invention is to propose polymer compositions that can combine the properties of thermosets and thermoplastics, that can be prepared by mixing a polymer with one or more additives enabling the formation of a cross-linked polymer composition, preferably a cross-linked network, comprising pending links and cross-links that are exchangeable by aldehyde-imine or imine-imine exchange reactions, without it being necessary to use polymers or additives containing primary amine functions in the cross-linking step. The polymer may be imine- and/or aldehyde-functionalised before the addition of the said additive or the addition of the said additive may enable the imine- and/or aldehyde-functionalisation of the polymer and the cross-linking.

Moreover, the object of the invention is a process to modify the behaviour, for example the rheology, of a polymer by addition of one or more additives to the composition including such a polymer. This additive or these additives is/are imine- and/or aldehyde-functionalised and enable(s) the formation of a composition of cross-linked polymers, preferably a cross-linked network containing exchangeable links, by aldehyde-imine exchange reactions and/or by imine-imine exchange reactions. The polymer may be imine- and/or aldehyde-functionalised before the addition of the said additive or the addition of the said additive may enable the imine- and/or aldehyde-functionalisation of the polymer and the cross-linking.

To do this, the inventors have conceived and developed compositions that enable cross-linked polymer compositions, preferably polymer networks, containing exchangeable cross-links and pending functions to be obtained.

The presence of exchangeable pending functions and exchangeable functions in the cross-links enables the macroscopic behaviour of the polymer networks formed to be easily controlled, independently of the degree of cross-linking. In this way, for a given degree of cross-linking, a given temperature and a given strain, a polymer network of the invention will relax stress quicker if it contains more exchangeable pending functions. Likewise, for a given degree of cross-linking, a given temperature and a given shear, a network of the invention will flow more rapidly if it contains more exchangeable pending functions.

The inventors have tried, without success, to prepare methacrylate and styrene polymer networks containing pending alcohol functions and cross-links containing ester functions with the aim of obtaining thermosetting systems that, while insoluble even at high temperature, can flow and are malleable.

To do this, polymer networks, prepared from monomers carrying alcohol functions, such as among others 2-hydroxyethyl methacrylate or 4-vinylbenzyl alcohol, and cross-linking agents containing ester functions, such as among others ethylene glycol dimethacrylate, 1,4-butanediol dimethacrylate, 1,6-hexanediol dimethacrylate or bisphenol A dimethacrylate, have been prepared in the presence of various transesterification catalysts, such as among others zinc acetate, titanium(IV) ethoxide, titanium(IV) isopropoxide, triphenylphosphine or triazabicyclodecene. The various formulations tested did not enable polymer compositions to be prepared that show the mechanical properties of a thermoset while still being transformable at high temperature after hardening without showing degradation of their structure or that could be recycled without the notable loss of their mechanical properties.

The inventors have also tried, without success, to prepare methacrylate polymer networks containing cross-links incorporating imine functions from monomers or polymers containing pending primary amine functions with the aim of obtaining thermosetting systems that, while insoluble even at high temperature, can flow and are malleable.

To do this, methacrylate polymer networks containing cross-links incorporating imine functions have been prepared from methyl methacrylate, of monomers carrying primary amine functions, such as 2-aminoethyl methacrylate, 2-aminoethyl methacrylamide or 4-vinylbenzylamine, and cross-linking agents containing imine functions, such as the compound of formula (I) CF1, and/or terephthaldehyde. The various formulations tested did not enable polymer compositions to be prepared that show the mechanical properties of a thermoset while still being transformable at high temperature after hardening without showing degradation of their structure or that could be recycled without the notable loss of their mechanical properties.

Likewise, the inventors have tried, without success, to prepare methacrylate and styrene polymer networks containing pending primary or secondary ketimine functions and cross-links containing secondary ketimines with the aim of obtaining thermosetting systems that, while insoluble even at high temperature, can flow and are malleable. The various formulations tested did not enable polymer compositions to be prepared that show the mechanical properties of a thermoset while still being transformable at high temperature after hardening or that could be recycled without the notable loss of their mechanical properties.

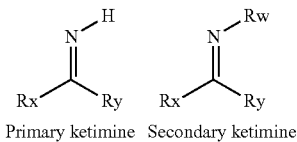

Primary ketimine   Secondary ketimine where Rx, Ry and Rw are hydrocarbon groups, identical or different, as defined below.

Unexpectedly, the inventors were able to successfully prepare polymer networks containing pending primary or secondary aldimine functions and/or aldehyde functions and cross-links incorporating secondary aldimines. In this way, the inventors have been able to successfully prepare thermosetting systems that, while insoluble even at high temperature, can flow and are malleable.

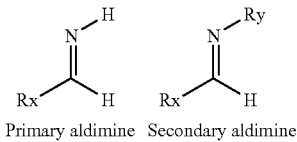

Primary aldimine   Secondary aldimine where Rx and Ry are hydrocarbon groups, identical or different, as defined below.

It has been possible to prepare polymer compositions that show the mechanical properties and insolubility of a thermoset but that are transformable after hardening at a temperature higher than the glass-transition temperature (Tg) or the melting temperature (Tf) of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C., without suffering destruction or degradation of the structure, and that can be recycled without notable loss of their mechanical properties.

DESCRIPTION OF THE INVENTION

The object of the invention is a composition comprising (a) cross-linked polymers containing pending links and cross-links that are exchangeable by aldehyde-imine exchange reactions and/or by imine-imine exchange reactions, obtained by cross-linking of linear or branched polymers; and (b) free monofunctional aldehydes and/or free monofunctional imines.

The linear or branched polymers preferably contain less than 0.5 mmol of primary amine and primary ammonium functions per gram of polymer before cross-linking and the compositions preferably contain less than 0.1 mmol of primary amine and primary ammonium functions per gram of polymer after cross-linking.

Preferably, these compositions comprise aldehydes and a molar fraction of at least 1% of the aldehyde functions are aromatic aldehydes. This molar fraction is calculated with respect to the total number of moles of aldehyde functional groups linked to polymers or to molecules. Preferably, the polymers, before cross-linking, are linear or branched polymers having side-groups carrying:
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom.

In an embodiment of the invention, the composition results from the mixture, in the molten state or in solution:
Of at least one linear or branched polymer P1 with side-groups carrying:
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom.
Of at least one additive carrying at least two imine and/or aldehyde functional groups that are capable of reacting with the side-groups of the polymer P1 to form a cross-linked network with links exchangeable by aldehyde-imine exchange reactions or by imine-imine exchange reactions;
preferably, free monofunctional aldehydes.

The additive is preferably a compound of formula (I) below:

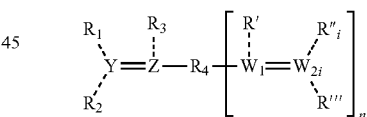

in which n, i, the dashed bond, Y and Z, $R_1$, $R_2$, $R_3$, $W_1$, $W_{2i}$, R', R''$_i$ and R''' are as defined as follows. $R_4$ represents a hydrocarbon group linked to the imine and/or aldehyde functions by a covalent bond through a carbon atom.

The additive can also be a linear or branched polymer P2 carrying
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom.

In an embodiment of the invention, the composition results from the mixture, in the molten state or in solution:
Of at least one linear or branched polymer P1' containing functions enabling grafting, A combination of molecules of which the molecules comprise at one end a functional group enabling covalent binding of the molecule to the polymer P1' and at the other end a functional group chosen from among an imine function linked by its carbon atom, an imine function linked by its nitrogen atom, or an aldehyde function, and/or molecules comprising at two of their extremities functional groups enabling covalent binding of the molecule to the polymer P1' and between these two extremities an imine function, the combination enabling grafting and the creation of pending links and cross-links that are exchangeable by aldehyde-imine exchange reactions and/or by imine-imine exchange reactions;

preferably, free monofunctional aldehydes.

Preferably, the aldehyde is a molecule in which the aldehyde function is carried by an aryl or heteroaryl group or the alkene function of a terpenoid.

The linear or branched polymer, preferably P1, P1' or P2, is preferably a polymer chosen from among vinyl polymers, polyolefins, polyamides, and polysaccharides.

Another object of the invention is a process for preparing a cross-linked polymer composition, said process comprising the following steps:
  Choosing a linear or branched polymer P1 with side-groups carrying:
    aldehyde functional groups; or
    imine functional groups linked to the polymer by the carbon atom; or
    imine functional groups linked to the polymer by the carbon atom; or
    aldehyde functional groups and imine functional groups linked to the polymer by the carbon atom;
  Choosing at least one additive carrying at least two imine and/or aldehyde functional groups that are capable of reacting with the side groups of the polymer P1 to form a cross-linked polymer composition containing links and cross-links exchangeable by aldehyde-imine exchange reactions and/or by imine-imine exchange reactions;
  Mixing, in the molten state or in solution, said polymer P1, said additive and if applicable a free monofunctional aldehyde to obtain the said composition.

Another object of the invention is a process for preparing a cross-linked polymer composition, said process comprising the following steps:
  Choosing a linear or branched polymer P1' containing functions enabling grafting;
  Choosing a combination of molecules of which the molecules comprise at one end a functional group enabling covalent binding of the molecule to the polymer P1' and at the other end a functional group chosen from among an imine function linked by its carbon atom, an imine function linked by its nitrogen atom, or an aldehyde function, and/or molecules comprising at two of their extremities functional groups enabling covalent binding of the molecule to the polymer P1' and between these two extremities an imine function, the combination enabling grafting and the creation of pending links and cross-links exchangeable by aldehyde-imine exchange reactions and/or by imine-imine exchange reactions;
  Mixing, in the molten state or in solution, said polymer P1, said combination and if applicable a free monofunctional aldehyde to obtain the said composition.

Another object of the invention is the use of aldehyde to catalyse imine-imine metathesis reactions and imine-aldehyde exchange reactions carried out in the previously defined compositions.

Another object of the invention is a material obtained from the composition according to the invention. Another object of the invention is a formulation comprising a composition according to the invention.

Another object of the invention is the use of an additive such as defined in the invention, or the combination such as defined in the invention, in the presence of a linear or branched polymer P1 or P1' for the formation of a composition comprising cross-linked polymers, preferably a cross-linked network, containing pending links and cross links that are exchangeable by aldehyde-imine exchange reactions and/or by imine-imine exchange reactions and free monofunctional aldehydes and/or free monofunctional imines.

Another object of the invention are combinations to cross-link linear or branched polymers, said combinations being chosen from among the combinations including:
  a free monofunctional aldehyde+compound of formula (I) according to the invention;
  a free monofunctional aldehyde+polymer P2 according to the invention;
  A and/or B+C, and optionally a free monofunctional aldehyde according to the invention;
  A and/or B and/or C+D, and optionally a free monofunctional aldehyde according to the invention;
  A and/or B+compound of formula (I) in which Z and $W_1$ are N, and optionally a free monofunctional aldehyde according to the invention; or
  C+compound of formula (I) in which Z and $W_1$ are a carbon atom, and optionally a free monofunctional aldehyde according to the invention A, B, C and D correspond to the following formulas: (A) $G_1$-Rx-CH=N-Ry, (B) $G_2$-R'x-CH=O, (C) $G_3$-R"y-N=CH—R"x and (D) $G_4$-R'''x-CH=N—R'''y-$G_5$ where the letters $G_1$, $G_2$, $G_3$, $G_4$ and $G_5$ represent a functional group enabling the molecules to be covalently linked to the polymer chain; Rx, R'x, R"x, R'''x and Ry, R"y and R'''y are hydrocarbon groups.

Another object of the invention is the use of a combination according to the invention, in the presence of a linear or branched polymer P1 or P1' for the formation of a composition comprising cross-linked polymers, preferably a cross-linked network, containing pending links and cross links that are exchangeable by aldehyde-imine exchange reactions and/or imine-imine exchange reactions and free monofunctional aldehydes and/or free monofunctional imines, in particular for modifying the rheology of a composition, such as an oil or a paint, including the said polymer P1 or P1' by addition of the combination according to the invention to the composition; the rheology is modified by choosing the concentration of the said combination.

DEFINITIONS

Definition of Polymer, Linear Polymer, Branched Polymer

A polymer comprises a set of polymer chains of different molecular dimensions, notably of different molar masses. A polymer chain according to this invention is a chain of atoms linked only by C—C, C=C, C—X or C=X covalent bonds, where X is a chemical element other than carbon, preferably with the exception of the C=N double bond in the main chain. The polymer chains are made up from the covalent assembly the large number of repetitive units called monomer units. The polymer chains so defined have molecular dimensions (characterised by their molar mass) very much larger than those of simple molecules, and are made up from the covalent assembly of more than 5 monomer units, preferably of more than 20 monomer units, still more preferably of more than 50 monomer units.

Polymer chains comprising a single type of monomer unit are called homopolymers. Polymer chains comprising several types of monomer unit are called copolymers. According to this invention, polymer and polymer chain designate both homopolymers and copolymers.

The monomer units constituting the polymer chain may be linked to a variable number of other monomer units. The number of other monomer units to which a monomer unit is linked is called valence. A monomer unit that is linked to a single other monomer unit has a valence of 1 and corresponds to an extremity of the polymer chain. A monomer unit that is linked to two other monomer units has a valence of 2 and corresponds to a linear sequence of a polymer chain. A monomer unit that is linked to more than two other monomer units has a valence greater than 2 and corresponds to a branching point. A polymer chain with two extremities is a linear polymer chain. A linear polymer chain is therefore composed of monomer units with a valence of 2 and two units with a valence of 1. A polymer chain that has more than two extremities and whose molar mass has a finite value is a branched polymer chain. A branched polymer chain is therefore composed of monomer units with a valence of 2, monomer with a valence greater than 2, and more than two monomer units with a valence of 1.

According to this invention, polymer and polymer chain designate both linear polymer chains and branched polymer chains.

Definition of Pending Function

A function is pending if it is linked by a covalent bond by one and only one of its hydrocarbon substituents (Rx or Ry of aldimines or aldehyde, see following definition) to a monomer unit with a valence greater than 1. In other words, a function is pending if it is linked by a covalent bond to a polymer chain by one and only one of its hydrocarbon substituents (Rx or Ry of aldimines or aldehyde, see following definition) and if it does not constitute an extremity of the polymer chain. A function is terminal, or constitutes a chain extremity, if it is linked by a covalent bond by one and only one of its hydrocarbon substituents (Rx or Ry of aldimines or aldehyde, see following definition) to a monomer unit with a valence equal to 1.

An imine function forms part of a cross-link if it is linked by its hydrocarbon substituent Rx through a covalent bond to a monomer unit covalently connected to at least two other monomer units not comprising the said imine function, and if it is linked by its hydrocarbon substituent Ry through a covalent bond to a monomer unit covalently connected to at least two other monomer units not comprising the said imine function.

In this way, the term "pending group" according to the present invention designates a side-group of the polymer chain. "Side-group" according to the present invention designates a substituent that is not an oligomer or a polymer. A side-group is not integrated into the main chain of the polymer. The term "pending imine group" according to the present invention designates a side-group comprising a primary aldimine or secondary aldimine function. In the presence of a secondary aldimine, Rx-C=NH-Ry, one of the two substituents is not linked to a polymer chain except through its own imine function. The imine may be linked to the side group by its carbon atom or its nitrogen atom. The term "pending aldehyde group" according to the present invention designates a side-group comprising an aldehyde.

Definition of a Free Molecule

According to this invention, a molecule is said to be "free" if it is not linked by a covalent bond to a polymer of the composition.

According to this invention, a "free monofunctional aldehyde" is a free molecule containing one and only one aldehyde function. A "free monofunctional aldehyde" may or may not contain one or more other functions insofar as these are not imine, aldehyde or primary amine functions. According to this invention, a "free monofunctional imine" is a free molecule containing one and only one imine function. A "free monofunctional imine" may or may not contain one or more other functions insofar as these are not imine, aldehyde or primary amine functions.

Definition of Cross-Linking

Cross-linking, or polymer chain cross-linking, consists of creating covalent chemical bonds between polymer chains that initially are not linked to other by covalent bonds. Cross-linking is accompanied by an increase in connectivity, through covalent bonds, between the various chains that make up the polymer. The cross-linking of linear or branched polymer chains is accompanied by an increase in the molecular dimensions of the chains, notably of the molar masses, and can lead to a network of cross-linked polymers being obtained. The cross-linking of a network of cross-linked polymers is accompanied by an increase in the mass fraction insoluble in good non-reactive solvents according to the definition given below.

According to the invention, cross-linking is the result, among other causes, of metathesis reactions between the imine functions and/or exchange reactions between the imine and aldehyde functions on the pending groups of the polymers and/or on the pending groups in the polymers and on compounds of formula (I). Preferably, cross-linking is the result only of metathesis reactions between the imine functions and/or exchange reactions between the imine and aldehyde functions on the pending groups of the polymers and/or on the pending groups in the polymers and on compounds of formula (I). In this way, for every cross-linking reaction by metathesis reaction between imine functions, and respectively for every cross-linking reaction by exchange reaction between imine and aldehyde functions, one equivalent of free monofunctional imine or one equivalent of free monofunctional aldehyde is generated, as illustrated in FIG. 3 in the case of cross-linking by a metathesis reaction of linear polymers functionalised by complementary pending imine functions.

"Network of cross-linked polymers" according to the present invention designates a set of polymer and/or oligomer chains linked to each other by covalent bonds that, when immersed at a mass fraction of $1/10$ in a good non-reactive solvents for the polymer and/or oligomer chains that it is constituted of, shows an insoluble mass fraction greater than 0.1%, preferably greater than 0.5%, 1%, 2%, 5%, 10%, 20%, 30%, 40%, 50% and 70%, after 48 hours of immersion at atmospheric pressure and at a temperature between the melting temperature and the boiling temperature of the solvent. A good non-reactive solvent is a good solvent that will not degrade the polymer chains or the imine or aldehyde functions and that will not participate in imine-imine or aldehyde-imine exchange reactions. The insolubility can be assessed by the naked eye or by passing the formulation through a filter with a porosity of 0.2 micrometers, preferably of 0.4 micrometers, still more preferably of 1 micrometer.

Cross-linking is accompanied by the creation of cross-links linking at least two polymer chains to each other. These cross-links preferably contain imine functions. In this way, after cross-linking, the composition includes imine functions in the cross-links and preferably polymers including pending imine and/or aldehyde functions.

Preferably, cross-linking is the result of metathesis reactions between the imine functions and/or exchange reactions between the imine and aldehyde functions on the pending groups of the polymers and/or on the pending groups in the polymers and on compounds of formula (I). In this way, for every cross-linking reaction by metathesis reaction between imine functions, and respectively for every cross-linking reaction by exchange reaction between imine and aldehyde functions, one equivalent of free monofunctional imine or one equivalent of free monofunctional aldehyde is generated. This is illustrated in FIG. 3 for the case of cross-linking by a metathesis reaction of linear polymers functionalised by complementary pending imine functions.

Definition of the Glass Transition

The glass transition temperature, Tg, is defined as the temperature at which the value of the damping factor, or loss factor, tan δ is at a maximum by dynamic mechanical analysis at 1 Hz. The damping factor, or loss factor, tan δ, is defined as the ratio of the loss modulus E" to the conservation modulus E' (Mechanical Properties of Solid Polymers, Author(s): I. M. Ward, J. Sweeney; Publisher: Wiley-Blackwell; Edition: 3rd Edition; Print ISBN: 9781444319507; DOI: 10.1002/9781119967125).

Definition of Polymer Composition

A polymer composition is defined as a homogenous or non-homogenous mixture of linear or branched polymers, which may be linked by cross links, containing pending links and cross links that are exchangeable by aldehyde-imine exchange reactions and/or by imine-imine exchange reactions, potentially with various charges, additives or solvents, as defined below.

In this way, "polymer composition" designates both solid formulations that contain little or no solvent(s) and liquid formulations containing a higher mass fraction of solvent(s).

In this way, "formulation" designates both solid formulations and liquid formulations.

According to the invention, a solid formulation contains less than 30% by mass of solvent(s), preferably less than 25% by mass of solvent(s), more preferably less than 20% by mass of solvent(s), still more preferably less than 15% by mass of solvent(s), still more preferably less than 5% by mass of solvent(s), still more preferably less than 2.5% by mass of solvent(s), still more preferably less than 1% by mass of solvent(s) and still more preferably less than 0.5% by mass of solvent(s).

According to the invention, a solid formulation is a material.

According to the invention, a liquid formulation contains more than 30% by mass of solvent(s), preferably more than 50% by mass of solvent(s), more preferably more than 60% by mass of solvent(s), still more preferably more than 70% by mass of solvent(s) and still more preferably more than 75% by mass of solvent(s).

According to the invention, a liquid formulation may be a material.

A solvent is defined as a molecule, or a mixture of molecules, that is liquid at ambient temperature and that has the property, at ambient temperature, of dissolving and/or diluting other substances without modifying them chemically and without being modified itself. Among solvents, a distinction is made between good solvents, which present the property of dissolving substances at room temperature without modifying them chemically and without being modified itself, and poor solvents, which present the property of diluting substances at ambient temperature without dissolving them, modifying them chemically and without being modified itself.

A solvent can therefore be a good solvent for one compound and a poor solvent for another compound.

Non-limiting examples of solvents include ethyl acetate, butyl acetate, acetone, acetonitrile, benzyl alcohol, acetic anhydride, anisole, benzene, butanol, butanone, chlorobenzene, chloroform, cyclohexane, dichloroethane, dichloromethane, dimethylformamide, dimethyl sulfoxide, dioxane, water, ethanol, glycol ether, diethyl ether, ethylene glycol, heptane, hexane, mineral oils, natural oils, synthetic oils, hydrocarbons, methanol, pentane, propanol, propoxypropane, pyridine, tetrachloroethane, tetrachloromethane, tetrahydrofuran, toluene, trichlorobenzene, xylene, and their mixtures.

Definition of Radicals

A "hydrocarbon" group according to the present invention is a group consisting of atoms of carbon and hydrogen. This group may also include heteroatoms and/or be substituted by halogens. The hydrocarbon group preferably includes 1-50, more preferably 1-18, still more preferably 1-12 carbon atoms.

"Heteroatom" according to present invention designates atoms of sulfur, nitrogen, oxygen, boron, phosphorus or silicon.

"Halogen" according to present invention designates atoms of fluorine, chlorine, bromine or iodine.

Hydrocarbon groups may be aliphatic or aromatic.

"Aliphatic" according to the present invention designates an "alkyl", "alkenyl", "alkanediyl", "alkenediyl" or "cycloalkyl" group. The valence of the group will be determined case-by-case.

An aliphatic group may include heteroatoms. In particular, it may include ester, amide, ether, thioether, secondary or tertiary amine, carbonate, urethane, carbamide or anhydride functions. If applicable, the aliphatic group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

An "alkyl" group according to the present invention designates a saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkyl" also includes:
"alkenyls", that is hydrocarbon chains comprising at least one double bond;
"heteroalkyls", that is alkyl groups as defined above comprising at least one heteroatom.

An "alkanediyl" group according to the present invention designates a divalent, saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkanediyl" also includes "alkenediyls", that is hydrocarbon chains comprising at least one double bond, for example a vinylene (ethenylene) group or a propenylene group, and "heteroalkanediyls", that is alkanediyl groups as defined above comprising at least one heteroatom.

"Terpenoid" according to the present invention designates any group comprising a skeleton close to a terpene. "Terpene" designates an isoprene derivative that is obtained by connection of $C_5H_8$ units, leading for example to monoterpenes and sesquiterpenes. "Close" designates that the skeleton is similar to a terpene or different in that at least one alkyl substituent that is normally present may be absent or carried by another atom. Furthermore, the skeleton may be substituted by various radicals such as aliphatic or oxy radicals, aldehydes, esters, alcohols, ethers and their sulfur and nitrogen equivalents. This "terpenoid" group will be monovalent or divalent, case by case.

A "cycloalkyl" group according to the present invention designates a cyclical alkyl chain, which may be saturated or partially unsaturated but not aromatic, preferably comprising 3-10 carbon atoms in the ring. The alkyl chain may include one or more heteroatoms; in this case it will be specifically called "heterocycloalkyl". The group may comprise more than one ring, and in this way includes fused, linked or spiro rings. Examples include cyclopropyl, cyclopentyl, cyclohexyl, cycloheptyl, pyrrolidinyl, piperidinyl, piperazinyl or morpholinyl groups. If applicable, the cycloalkyl group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions. If applicable, the cycloalkyl group maybe divalent; in this case it is preferably called a "cycloaliphatic" radical.

"Aromatic" according to the present invention designates a monovalent or multivendor group comprising an aromatic hydrocarbon group. The valence of the group will be determined case-by-case.

The aromatic group may include heteroatoms; in this case it is called a "heteroaromatic" radical. In particular, it may include ester, amide, ether, thioether, secondary or tertiary amine, carbonate, urethane, carbamide or anhydride functions. An aromatic group may comprise one or more rings that are fused or covalently linked. If applicable, the aromatic group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

The term "aromatic" includes "arylaromatic" groups, that is a group comprising at least one aromatic group and at least one aliphatic group, as defined. The aliphatic group may be linked to one part of the molecule and the aromatic group to another part of the molecule. The group may comprise two aromatic groups, each linked to a part of the molecule and linked between them by an aliphatic chain.

"Aryl" according to the present invention designates an aromatic hydrocarbon group. The term "aryl" includes aralkyl and alkyl-aryl groups. The aromatic hydrocarbon group may be substituted once or several times, notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

"Alkyl-aryl" according to the present invention designates an alkyl group, as defined above, linked to the rest of the molecule through an aromatic group, as defined above.

"Aralkyl" according to the present invention designates an aryl group, as defined above, linked to the rest of the molecule through an aliphatic group, as defined above.

"Heteroaryl" according to the present invention designates an aryl group in which at least one of the atoms of the aromatic ring is a heteroatom. "Heteroalkyl-aryl" according to the present invention designates an alkyl-aryl group, as defined, substituted by at least one heteroatom. "Heteroaralkyl" according to the present invention designates an aralkyl group, as defined, substituted by at least one heteroatom.

The term "imine" according to the present invention designates a group comprising the function C=N. According to the invention, the imine is a primary or secondary aldimine:

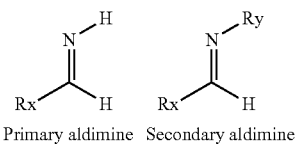

Primary aldimine  Secondary aldimine where Rx and Ry are different from H and may be identical or different. Rx and Ry are hydrocarbon radicals as defined above. Preferably, the imine is a secondary aldimine. According to the invention, the radicals Rx and Ry are bound to the imine function by a covalent bond through a carbon atom. The imine and aldehyde groups of the invention have the following structures:

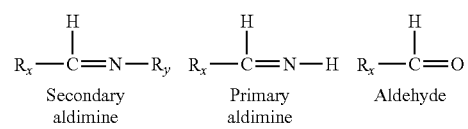

Secondary aldimine  Primary aldimine  Aldehyde where Rx and Ry are hydrocarbon groups and where the atom of the groups Rx and Ry linked to the imine or aldehyde function is a carbon atom.

In particular, independently for each group, Rx represents an alkyl, aryl, aralkyl, alkyl-aryl or cycloalkyl radical. This radical can contain heteroatoms, in particular chosen from among O, N, S or Si, and/or may be substituted. Rx is preferably and aryl, heteroaryl or terpenoid group. Preferably, when the aldehyde function is carried by a terpenoid group, the aldehyde function is linked directly to an alkene function of the terpenoid.

In particular, this radical Rx may be substituted by functional groups such as ester or amide functions. In particular, this radical is substituted by a halogen, an -Rz, —OH— NHRz, —NRzR'z, —C(O)—H, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. In particular, this radical Rx may include ester, amide, ether, thioether, secondary or tertiary amine, carbonate, urethane, carbamide or anhydride functions.

In particular, independently for each group, Ry represents an alkyl, aryl, aralkyl, alkyl-aryl or cycloalkyl radical. This radical can contain heteroatoms, in particular chosen from among O, N, S or Si, and/or may be substituted. In particular, this radical Ry may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. In particular, this radical Ry may include ester, amide, ether, thioether, secondary or tertiary amine, carbonate, urethane, carbamide or anhydride functions.

These imine and aldehyde groups are preferably linked, through Rx and/or Ry, to a polymer chain or to a functional group G enabling covalent linkage of molecules to polymer chains to be functionalised, as defined below.

DESCRIPTION OF THE DRAWINGS

FIG. 1. Representation of the molecules that may be used for the functionalisation and one-step cross-linking of the polymers.

FIG. 2. Schematic representation of the functionalisation of linear polymers by molecule A (left), or molecule C (right), through the creation of covalent bonds between molecule A (or C) and the polymer chains. The functions enabling the grafting of molecules A (left), or molecule C (right), may form part of the main chain (above) or side-/pending groups (below) of the main polymer chain to be functionalised.

FIG. 3. Schematic representation of cross-linking by a metathesis reaction of linear polymers functionalised by complementary pending imine functions.

DETAILED DESCRIPTION

Figure 4:
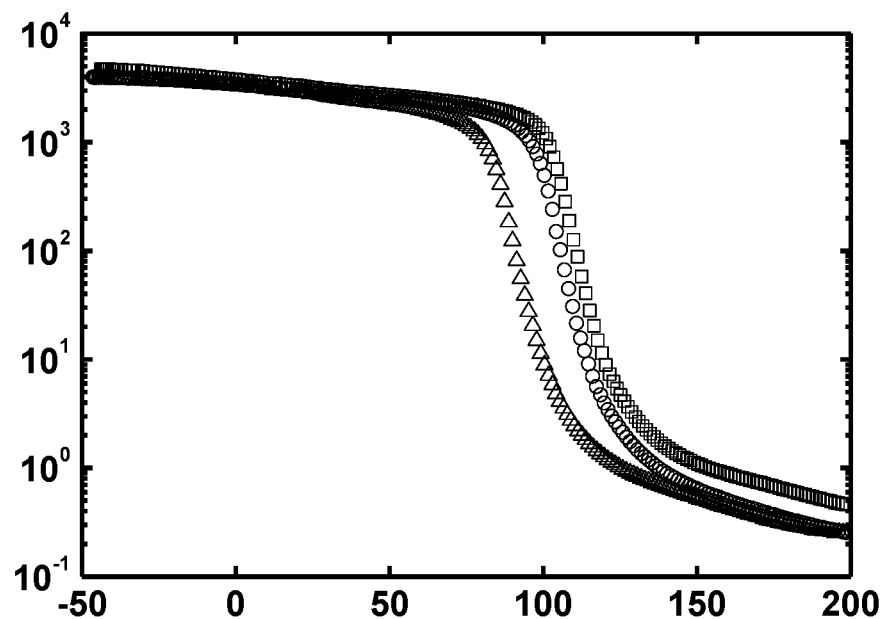
FIG. 4. Evolution of the elastic modulus (y-axis, MPa) as a function of temperature (x-axis, ° C.) for the non-recycled cross-linked polymer network N7 (1st generation; triangles), the twice-recycled cross-linked polymer network N7 (3rd generation; circles) and the three-times-recycled cross-linked polymer network N7 (4th generation; squares).

The object of the invention is a composition comprising (a) cross-linked polymers containing pending links and cross-links that are exchangeable by aldehyde-imine exchange reactions and/or by imine-imine exchange reactions, obtained by cross-linking of linear or branched polymers; and (b) free monofunctional aldehydes and/or free monofunctional imines. Preferably, the cross-linking step does not require the use of polymers or additives containing primary amine functions. Cross-linking is the result, partially or totally, of metathesis reactions between the imine functions and/or exchange reactions between the imine and aldehyde functions on the pending groups of the polymers and/or on the pending groups in the polymers and on compounds of formula (I). In this way, for every cross-linking reaction by metathesis reaction between imine functions, and respectively for every cross-linking reaction by exchange reaction between imine and aldehyde functions, one equivalent of free monofunctional imine or one equivalent of free monofunctional aldehyde is generated, as illustrated in FIG. 3 in the case of cross-linking by a metathesis reaction of linear polymers functionalised by complementary pending imine functions. Such a composition preferably forms a network of linear or branched polymers containing pending links and cross-links that are exchangeable by aldehyde-imine exchange reactions and/or by imine-imine exchange reactions. Such a composition preferably contains less than 1 mmol, still more preferably less than 0.8 mmol, still more preferably less than 0.6 mmol, still more preferably less than 0.4 mmol, still more preferably less than 0.2 mmol, still more preferably less than 0.1 mmol, still more preferably less than 0.05 mmol, still more preferably less than 0.025 mmol, still more preferably less than 0.02 mmol, still more preferably less than 0.01 mmol, still more preferably less than 0.005 mmol, still more preferably less than 0.01 mmol, still more preferably less than 0.005 mmol of primary amine and primary ammonium functions per gram of polymer after cross-linking.

Preferably, the polymers, before cross-linking, are linear or branched polymers having side-groups carrying:
- aldehyde functional groups; or
- pending imine functional groups linked to the polymer by their carbon atom; or
- pending imine functional groups linked to the polymer by their nitrogen atom; or
- aldehyde functional groups and pending imine functional groups linked to the polymer by their carbon atom.

These polymers can be functionalised prior to and/or during cross-linking preferably leading to the formation of a network of cross-linked polymers containing pending links and cross-links that are exchangeable by aldehyde-imine exchange reactions and/or by imine-imine exchange reactions.

The side groups that are exchangeable by aldehyde-imine exchange reactions and/or by imine-imine exchange reactions of the linear or branched polymers are preferably distributed along all the whole chain. Therefore, preferably, the linear or branched polymers do not present a diblock structure, with one block containing the side groups and another block not containing side groups that are exchangeable by aldehyde-imine exchange reactions and/or by imine-imine exchange reactions. Preferably, the side groups that are exchangeable by aldehyde-imine exchange reactions and/or by imine-imine exchange reactions are randomly distributed all along the polymer chain. Preferably, if the side groups that are exchangeable by aldehyde-imine exchange reactions and/or by imine-imine exchange reactions are distributed in blocks, the polymer has a multiblock structure with blocks containing the exchangeable side groups distributed all along the polymer chain.

The polymers before cross-linking preferably contain less than 2 mmol, more preferably less than 1.5 mmol, still more preferably less than 1 mmol, still more preferably less than 0.8 mmol, still more preferably less than 0.6 mmol, still more preferably less than 0.5 mmol, still more preferably less than 0.4 mmol, still more preferably less than 0.25 mmol, still more preferably less than 0.2 mmol, still more preferably less than 0.1 mmol, still more preferably less than 0.05 mmol of primary amine and primary ammonium functions per gram of polymer.

When the polymers before cross-linking are branched polymers, these polymers are preferably not dendrimers. When the branched polymers before cross-linking are dendrimers, these dendrimers are preferably third-generation dendrimers or second-generation dendrimers.

In a first embodiment, the polymer is functionalised before cross-linking. In particular, the composition results from the mixture, in the molten state or in solution:
- Of at least one linear or branched polymer P1 with side-groups carrying:
  - aldehyde functional groups; or
  - imine functional groups linked to the polymer by their carbon atom; or
  - imine functional groups linked to the polymer by their nitrogen atom; or
  - aldehyde functional groups and imine functional groups linked to the polymer by their carbon atom;
- Of at least one additive carrying at least two imine and/or aldehyde functional groups that are capable of reacting with the pending groups of the polymer P1 to form a cross-linked polymer composition, preferably a cross-linked network, containing pending links and cross-links that are exchangeable by aldehyde-imine exchange reactions and/or by imine-imine exchange reactions.

Preferably, free monofunctional aldehydes.

To enable the formation of a cross-linked polymer composition, preferably a cross-linked polymer network, a cross-linking agent that will not, on its own, react with itself and lose its functionality, is preferably used as an additive. In this way, the cross-linking agent carries:
- aldehyde functions; or
- imine functions linked by means of their carbon atom; or
- imine functions linked by means of their nitrogen atom; or
- aldehyde functions and imine functions linked by means of their carbon atom.

The additive (cross-linking agent) may be a molecule and/or a polymer. Combinations of molecules and/or of polymers may be envisaged.

In a first embodiment, the additive is a molecule having at least two imine and/or aldehyde functions. This additive is also called a "bi- or multifunctional cross-linking agent". This additive may comprise only imine functions, all linked to the rest of the molecule by the carbon atom of the imine bond; or only imine functions, all linked to the rest of the molecule by the nitrogen atom of the imine bond; or only aldehyde functions. It may also comprise both aldehyde functions and imine functions, all linked to the rest of the molecule by the carbon atom of the imine bond.

This additive is preferably a compound of formula (I) below:

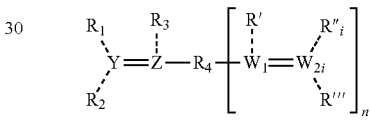

in which
n is a whole number between 1 and 6;
i is a whole number between 1 and n;
the dashed bond is present or absent, depending on the valence of $Y$, $Z$, $W_1$ and $W_2$;
$Y$ and $Z$ are different, and each represents either C or N; or $Y$ is O and $Z$ is C;
  when $Y$ represents C, $Z$ represents N and $R_1$ represents a hydrocarbon group, $R_2$ represents H and $R_3$ is absent;
  when $Y$ represents N, $Z$ represents C and $R_1$ represents H or a hydrocarbon group, $R_2$ is absent and $R_3$ represents H;
  when $Y$ represents O, $Z$ represents C and $R_1$ and $R_2$ are absent and $R_3$ represents H;
$R_4$ represents a hydrocarbon group linked to the imine and/or aldehyde functions by a covalent bond through a carbon atom;
in each block $W_1(R')=W_{2i}(R''_i)(R''')$,
  $W_1$ and $W_2$ are different, and each represents either C or N; or $W_{2i}$ is O and $W_1$ is C;
  when $W_{2i}$ represents C, $W_1$ represents N and R' is absent, $R''_i$ represents a hydrocarbon group and R''' represents H;
  when $W_{2i}$ represents N, $W_1$ represents C and R' represents H, $R''_i$ represents H or a hydrocarbon group and R''' is absent;
  when $W_{2i}$ represents O, $W_1$ represents C and $R''_i$ and R''' are absent and R' represents H;
when Z represents C, $W_1$ represents C;
when Y represents C, $W_{2i}$ represents C.

$R_4$ may in particular represent a ring hence enabling the presence of several $[W_1(R')=W_{2i}(R''_i)(R''')]$ blocks, possibly on each carbon atom of the ring.

The [$W_1(R')=W_{2i}(R''_i)(R''')$] block is present n times, depending on the number of substitutions possible on the radical $R_4$. Compound (I) may therefore be a compound known as a "star compound".

n is a whole number between 1 and 6, preferably between 1 and 4.

i is a whole number between 1 and n.

From one block to another (and likewise for different values of i), the definition of $W_{2i}$ or $R''_i$ may vary, which means that the blocks are not necessarily identical to each other. On the contrary, the definition of $W_1$ may not vary from one block to another, being either always C or always N. Likewise, the definition of R' may not vary from one block to another, being either always H or always absent. Likewise, the definition of R''' may not vary from one block to another, being either always H or always absent.

$R_4$ may be linked to the carbon atom or to the nitrogen atom of the imine and/or aldehyde functions. $R_4$ is linked to the imine and/or aldehyde functions by a covalent bond through a carbon atom. $R_4$ is preferably an aliphatic, aromatic, arylaliphatic or cycloaliphatic group that may also comprise heteroatoms such as O, N, S, or Si. In a preferred embodiment, $R_4$ represents an aromatic or heteroaromatic group. Preferably, $R_4$ represents a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

Preferably, when Y represents O, Z represents C, $W_1$ represents C, $W_{2i}$ represents O, $R_1$, $R_2$, $R''_i$ and R''' are absent and $R_3$ and R' represent H.

Preferably, when Y represents N or O, Z represents C, $W_1$ represents C, $W_{2i}$ represents N or O, $R_2$, $R_2$, $R''_i$ and R''' are absent, $R_3$ and R' represent H, and, depending on the valence of Y, $W_{2i}$, $R_1$ and $R''_i$ represent a hydrocarbon group or are absent when Y and $W_{2i}$ represent O.

Preferably, when Y represents C, Z represents N, $W_1$ represents N, $W_{2i}$ represents C, $R_3$ and R' are absent, $R_2$ and R''' represent H, and $R_1$ and $R''_i$ represent a hydrocarbon group.

When it is present, $R_1$ preferably represents a hydrogen atom or an alkyl, alkenyl, aryl, cycloalkyl, heteroaryl, heteroalkyl or heterocycloalkyl group, and each of these groups may be substituted. $R_2$ represents H or is absent. $R_3$ represents H or is absent. Preferably, $R_1$ represents an alkyl, alkenyl, aryl, heteroaryl, alkyl-aryl, heteroalkyl-aryl, aralkyl, heteroaralkyl, cycloalkyl or heterocycloalkyl group; each of these groups may be substituted.

When it is present, $R''_i$ preferably represents a hydrogen atom or an alkyl, alkenyl, aryl, cycloalkyl, heteroaryl, heteroalkyl or heterocycloalkyl group, and each of these groups may be substituted. R' represents H or is absent. R''' represents H or is absent. Preferably, $R''_i$ represents an alkyl, alkenyl, aryl, heteroaryl, alkyl-aryl, heteroalkyl-aryl, aralkyl, heteroaralkyl, cycloalkyl or heterocycloalkyl group; each of these groups may be substituted.

The choice of the nature of functional groups present on the compound of formula (I) will depend on the nature of the functional groups present on the polymer P1.

In this way, when the pending groups of the polymer P1 carry imine functional groups linked to the main chain by the carbon atom, a compound of formula (I) in which Z and $W_1$ represent N is chosen as the additive.

In this way, when the pending groups of the polymer P1 carry aldehyde functional groups, a compound of formula (I) in which Z and $W_1$ represent N is chosen as the additive.

In this way, when the pending groups of the polymer P1 carry aldehyde functional groups and imine functional groups linked to the main chain by the carbon atom, a compound of formula (I) in which Z and $W_1$ represent N is chosen as the additive.

In this way, when the pending groups of the polymer P1 carry imine functional groups linked to the main chain by the nitrogen atom, a compound of formula (I) in which Z and $W_1$ represent C and in which Y and $W_{2i}$ represent, independently of one another, N or O is chosen as the additive.

In a second embodiment, the additive is a polymer P2 carrying:
aldehyde functional groups; or
pending imine functional groups linked to the polymer by the carbon atom; or
pending imine functional groups linked to the polymer by the nitrogen atom; or
aldehyde functional groups and pending imine functional groups linked to the polymer by the carbon atom.

The choice of the nature of functional groups present on the polymer P2 will depend on the nature of the functional groups present on the polymer P1.

In this way, when the pending groups of the polymer P1 carry aldehyde functional groups, a polymer comprising pending imine functional groups, where the imine is linked to the main chain by its nitrogen atom, is chosen as the polymer P2.

In this way, when the pending groups of the polymer P1 carry imine functional groups linked to the main chain by the carbon atom, a polymer comprising pending imine functional groups, where the imine is linked to the main chain by its nitrogen atom, is chosen as the polymer P2.

In this way, when the pending groups of the polymer P1 carry aldehyde functional groups and imine functional groups linked to the main chain by the carbon atom, a polymer comprising pending imine functional groups, where the imine is linked to the main chain by its nitrogen atom, is chosen as the polymer P2.

In this way, when the pending groups of the polymer P1 carry imine functional groups linked to the main chain by the nitrogen atom, a polymer comprising aldehyde functional groups and/or pending imine functional groups, where the imine is linked to the main chain by its carbon atom, is chosen as the polymer P2.

Hence the invention enables two linear or branched polymers to be assembled by aldehyde-imine exchange reactions and/or by imine-imine exchange reactions, even if the chemical natures of the polymers are different. In this way the invention enables two thermosetting polymers to be assembled. The assembly of a polymer composition according to the invention with a linear or branched polymer P2 may also be envisaged along the same principle. This principle can even be extended to two compositions according to the invention, which can be assembled.

In a second embodiment, the functionalisation and the cross-linking are carried out simultaneously.

In particular, the composition results from the mixture, in the molten state or in solution:

Of at least one linear or branched polymer P1' containing functions enabling grafting, A combination of molecules of which the molecules comprise at one end a functional group enabling covalent binding of the molecule to the polymer P1' and at another end a functional group chosen from among an imine function linked by its carbon atom (A), an imine function linked by its nitrogen atom (C), or an aldehyde function (B), and/or molecules comprising at two of their extremities functional groups enabling covalent binding of the molecule to the polymer P1' and between these two extremities an imine function (D), the combination enabling grafting and the creation of pending links and cross-links that are exchangeable by aldehyde-imine exchange reactions and/or by imine-imine exchange reactions;

preferably, free monofunctional aldehydes.

In this way, the polymer P1' may be functionalised and cross-linked on addition of the additive. For this, the polymer contains functions enabling grafting, for example in its main chain or on its side/pending groups.

FIG. 1 shows molecules that may be used for the functionalisation and one-step cross-linking of the polymers. The letters $G_1$, $G_2$, $G_3$, $G_4$ and $G_5$ represent a functional group enabling the covalent binding of the molecules to the polymer chain to be functionalised. The functional groups $G_1$, $G_2$, $G_3$, $G_4$ and $G_5$ are chosen as a function of the polymers to be functionalised, the functions enabling grafting to these polymers and the grafting conditions (temperature, reaction medium (molten state or in solution), kinetics, use of a catalyst, etc.). Preferably the groups $G_1$, $G_2$, $G_3$, $G_4$ and $G_5$ are identical.

As non-limiting examples, the functions G may be thiol functions enabling the functionalisation of the alkene bonds of polydienes, such as polybutadiene, polyisoprene and their copolymers, vinyl copolymers with pending alkene groups, or polyolefins obtained by ring-opening metathesis polymerisation (ROMP) or by acyclic diene metathesis (ADMET) (Charles E. Hoyle, Christopher N. Bowman, Angew. Chem. Int. Ed. 2010, 49, 1540-1573; Kemal Arda Günay, Patrick Theato, Harm-Anton Klok, Journal of Polymer Science Part A: Polymer Chemistry 2013, 51, 1-28). The functions G may also be maleimide or methacrylic, acrylic, styrenic or maleic ester functions so as to enable radical grafting to polyethylene and polypropylene for example (G. Moad, Prog. Polym. Sci. 1999, 24, 81-142; Elisa Passagliaa, Serena Coiai, Sylvain Augier, Prog. Polym. Sci. 2009, 34, 911-947). The functions G may be isocyanate functions that will react with the pending alcohol, amine or thiol groups on the polymers to be functionalised (Kemal Arda Günay, Patrick Theato, Harm-Anton Klok, Journal of Polymer Science Part A: Polymer Chemistry 2013, 51, 1-28; Charles E. Hoyle, Andrew B. Lowe, Christopher N. Bowman, Chem. Soc. Rev., 2010, 39, 1355-1387). The functions G may also be electrophilic olefins that can undergo Michael additions with nucleophiles such as thiols, primary or secondary amines or phosphines (Brian D. Mather, Kalpana Viswanathan, Kevin M. Miller, Timothy E. Long, Prog. Polym. Sci. 2006, 31, 487-531). Among the electrophilic olefins, non-limiting examples include acrylates, acrylamides, maleimides, methacrylates and vinylic sulfones. The functions G may also be nucleophilic functions such as alcohols, thiols, amines or carboxylic acids, which can give nucleophilic substitution or ring-opening reactions (Kemal Arda Günay, Patrick Theato, Harm-Anton Klok, Journal of Polymer Science Part A: Polymer Chemistry 2013, 51, 1-28). These functional groups can, for example, open epoxides present in the main chain of the polymers, such as are found in epoxidised natural rubber, or pending epoxide functions such as are found in vinylic copolymers prepared with glycidyl methacrylate. The functions G may also be alcohol, thiol or amine functions that can react with pending ester or activated ester functions to give new ester, thioester or amide functions. This approach can notably be used to functionalise vinylic polymers with pending ester functions, such as for example poly(methyl methacrylate). The functional groups enabling the molecule containing the imine or aldehyde function to be covalently linked to the polymer P1' are therefore numerous and varied, and the person skilled in the art knows how to select the functional group of choice depending on the functions present on the polymer P1' and the grafting conditions (temperature, reaction medium (molten state or in solution), kinetics, use of a catalyst, etc.).

FIG. 1 defines molecules (A) $G_1$-Rx-CH=N-Ry, (B) $G_2$-R'x-CH=O, (C) $G_3$-R"y-N=CH—R"x et (D) $G_4$-R'"x-CH=N—R'"y-$G_5$ where the letters $G_1$, $G_2$, $G_3$, $G_4$ and $G_5$ represent a functional group enabling the molecules to be covalently linked to the polymer chain; Rx, R'x, R"x, R'"x et Ry, R"y and R'"y are hydrocarbon groups. The labels "Rx", "Rw", "Rv" and "Ry" are used by analogy to the definition of the pending imine and aldehyde functional groups according to the invention, without necessarily being identical.

In particular, Rx, R'x and R"x each represents, independently of one another, an aliphatic, terpenoid, aromatic, arylaliphatic or cycloaliphatic radical. This radical can contain heteroatoms, in particular chosen from among O, N, S or Si, and/or may be substituted. Rx, R'x, R"x and R'"x are preferably an aromatic, heteroaromatic or terpenoid group. Preferably, when the aldehyde function is carried by a terpenoid group, the aldehyde function is linked directly to an alkene function of the terpenoid.

In particular, Rx, R'x, R"x and R'"x, independently of one another, may each be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, Rz, identical or different, representing a $C_1$-$C_{50}$ alkyl radical. In particular, this radical Rx, R'x, R"x or R'"x may include ester, amide, ether, thioether, secondary or tertiary amine, carbonate, urethane, carbamide or anhydride functions.

In particular, Ry, R"y and R'"y each represents, independently of one another, an aliphatic, aromatic, arylaliphatic or cycloaliphatic radical. This radical can contain heteroatoms, in particular chosen from among O, N, S or Si, and/or may be substituted. In particular, this radical Ry, R"y or R'"y may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, Rz, identical or different, representing a $C_1$-$C_{50}$ alkyl radical. In particular, this radical Ry, R"y or R'"y may include ester, amide, ether, thioether, secondary or tertiary amine, carbonate, urethane, carbamide or anhydride functions.

FIG. 2 schematically shows the functionalisation of linear polymers by molecule A or C through the creation of covalent bonds between molecule A (or C) and the polymer chains.

The combinations enabling the one-step cross-linking and functionalisation of polymers are:

A+C: Polymers functionalised with pending amine functions attached by the carbon (A)+polymers functionalised with pending amine functions attached by the nitrogen (C) and cross-linking by imine-imine metathesis reactions (FIG. 3). Imine-imine metathesis reactions can take place between A and C before these functions graft onto the polymers (which generates a molecule equivalent to molecule D).

B+C: Polymers functionalised with pending aldehyde functions (B)+polymers functionalised with pending amine functions attached by the nitrogen (C) and cross-linking by aldehyde-imine exchange reactions. Aldehyde-imine exchange reactions can take place between B and C before these functions graft onto the polymers (which generates a molecule equivalent to molecule D).

A+D: Polymers cross-linked by molecule D+polymers functionalised with pending amine functions attached by the carbon (A). Imine-imine metathesis reactions can take place between A and D before these functions graft onto the polymers.

B+D
C+D
A+B+C
A+B+D
B+C+D
A+B+C+D

In summary, any combination in which on average at least two imine and/or aldehyde functions will be grafted per polymer chain and linked to the main chain by the carbon atom and two imine functions will be grafted per polymer chain and linked to the main chain by the nitrogen atom.

Free monofunctional aldehydes may be added in each case.

Other combinations are possible when a compound of formula (I), defined above, is used:

A+compound (I) in which Z and $W_1$ are N. In this way, polymers functionalised with pending imine functions linked to the main chain by the carbon atom (A) are prepared, then cross-linking is carried out by an imine-imine metathesis reaction between the pending functions and compound (I). Imine-imine metathesis reactions can take place between A and compound (I) before these functions graft onto the polymers.

B+compound (I) in which Z and $W_1$ are N
A+B+compound (I) in which Z and $W_1$ are N
C+compound (I) in which Z and $W_1$ are C Again, there must be on average at least two pending exchangeable functions grafted per polymer chain (through A, B or C). The quantity of compound (I) will vary according to its functionality. Nevertheless, it can be said that compound (I) must also supply on average at least two imine or aldehyde functions per polymer chain. These functions must be complementary to the functions grafted onto the polymers (through A, B or C).

Free monofunctional aldehydes may be added in each case.

In the compositions according to the invention, the polymers comprise pending imine and/or aldehyde functions. They also include imine functions in their side-chains forming cross-links. This enables an exchange between imines and improves the cross-linking of the polymers. The inventors think that the exchange reactions between imines and between imines and aldehydes enable a circulation of cross-links and could explain the thermoplastic behaviour when the composition, in itself, is insoluble like a thermoset.

The compositions also comprise free monofunctional aldehydes and/or free monofunctional imines formed during the creation of cross-links.

A compound having a single imine or aldehyde function may also be added to any of the compositions previously described. This additional compound enables the properties, notably the viscosity, of the polymer compositions to be modulated. This compound may comprise an aryl, heteroaryl or terpenoid group linked to the carbon of the aldehyde or imine. Preferably, when the aldehyde function is carried by a terpenoid group, the aldehyde function is linked directly to an alkene function of the terpenoid.

Furthermore, the compositions according to the invention preferably comprise free monofunctional aldehydes. Unexpectedly, the inventors have discovered that exchange reactions between imines can be catalysed by an aldehyde, which can be present in the polymer (pending aldehyde group) or as a molecule not linked to the polymers, said to be "free". The free monofunctional aldehyde may be added before, during or after the addition of the additive.

The aldehyde function may be supplied by a molecule comprising at least one —CHO group: additive of formula (I) and/or additive P2 and/or free monofunctional aldehyde. Preferably, in the presence of a molecule, the aldehyde-functionalised molecule used to catalyse the imine metathesis is an aromatic aldehyde, that is a molecule in which the aldehyde function is carried by an aryl or heteroaryl group, preferably a benzene ring. Notably, benzaldehyde and its derivatives can be mentioned. Preferably, the aldehyde-functionalised molecule used to catalyse the imine metathesis is a molecule in which the carbon of the aldehyde function is linked by a covalent bond to an alkene function of a terpenoid. Notably, the two isomers of citral, geranial and neral, and their derivatives can be mentioned.

Unexpectedly, the inventors have discovered that the imine and aldehyde functions can exchange their substituents according to the following reaction:

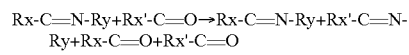

Preferably, the carbon atom of the imine functions and the carbon atom of the aldehyde functions are linked directly to a carbon atom of an aryl or heteroaryl group or to the alkene function of a terpenoid.

The use of aldehyde-functionalised molecules, and more particularly of aromatic aldehydes, such as benzaldehyde and its derivatives, such as vanillin, and terpenoid aldehydes, such as cinnamaldehyde, as imine metathesis catalysts presents many advantages. These molecules are compatible with many polymers; these molecules are unlikely to introduce parasite reactions in the polymer matrices/materials; these molecules are commercially available, can be biosourced or are of natural origin; and many aromatic aldehydes and terpenoid aldehydes have low toxicity or are non-toxic, as is shown by their use in the food and cosmetics industries.

As illustrated in the examples below, the presence of a pending or free aldehyde will catalyse the imine-imine metathesis and imine-aldehyde exchange reactions.

Thus, another object of the invention is a method to catalyze imine-imine metathesis reactions and imine-aldehyde exchange reactions, comprising adding an aldehyde in a composition comprising imine-functionalized polymer.

The polymer P1, or P1', and if applicable the polymer P2, is preferably a thermoplastic polymer or a thermosetting polymer.

By the process according to the invention, polymer preparations having the properties of thermosets and thermoplastics may be prepared from any thermoplastic polymer.

The polymer may be chosen from among:
vinylics, in particular polystyrenes, poly(meth)acrylates, poly(meth)acrylamides, polydienes such as polyisoprenes and polybutadienes, poly(vinyl chloride)s, polyfluorinated polymers, poly(vinyl acetate)s, polyvinylpyrrolidone or polyvinylcarbazole,
polyolefins, in particular polyethylene and polypropylene, unsaturated polyolefins,
polyamides,
polysaccharides.

These polymers may be functionalised to introduce pending imine- or aldehyde-functionalised side groups or to introduce groups or functions enabling grafting. The introduction of these pending imine- or aldehyde-functionalised side groups can be carried out by various processes known to the person skilled in the art: copolymerisation of polymer-precursor monomers with imine- or aldehyde-functionalised monomers (the imine or aldehyde functions are not integrated into the main chain of the polymer being formed, but are found on a pending side group), grafting onto a reactive function of the polymer, copolymerisation of polymer-precursor monomers with monomers containing one or more functions that will serve to graft the pending imine or aldehyde functions after formation of the polymer. These functions that will serve to graft the pending imine or aldehyde functions may be functions that are not implicated in the polymerisation reaction or may be functions that are implicated in the polymerisation reaction but that remain unreacted at the end of polymerisation, either because of the stoichiometry/functionality of the monomer mix or because the polymerisation stopped before the complete conversion of all the polymerisable functions. Such processes are known to the person skilled in the art and are notably used in the synthesis of polymers by polycondensation and by polyaddition. For example, the polymer P1 is obtained by copolymerisation, by a radical route or by polycondensation, by polymerisation by coordination, or by polyaddition or by ring-opening of a monomer precursor to a thermoplastic polymer and of a monomer carrying the imine- or aldehyde-functionalised side group. For example, the polymer P1' is obtained by copolymerisation, by a radical route or by polycondensation, by polymerisation by coordination, or by polyaddition or by ring-opening of a monomer precursor to a thermoplastic polymer and of a monomer carrying the side group enabling the grafting of the molecule containing the imine or aldehyde function. Likewise, the introduction of groups or functions enabling grafting can be carried out by various processes known to the person skilled in the art (Charles E. Hoyle, Christopher N. Bowman, Angew. Chem. Int. Ed. 2010, 49, 1540-1573; Kemal Arda Günay, Patrick Theato, Harm-Anton Klok, Journal of Polymer Science Part A: Polymer Chemistry 2013, 51, 1-28; G. Moad, Prog. Polym. Sci. 1999, 24, 81-142; Elisa Passagliaa, Serena Coiai, Sylvain Augier, Prog. Polym. Sci. 2009, 34, 911-947; Charles E. Hoyle, Andrew B. Lowe, Christopher N. Bowman, Chem. Soc. Rev., 2010, 39, 1355-1387; Brian D. Mather, Kalpana Viswanathan, Kevin M. Miller, Timothy E. Long, Prog. Polym. Sci. 2006, 31, 487-531; T. C. Chung, Prog. Polym. Sci. 2002, 27, 39-85. Chulsung Bae, John F. Hartwig, Hoyong Chung, Nicole K. Harris, Karen A. Switek, Marc A. Hillmyer, Angew. Chem. Int. Ed. 2005, 44, 6410-6413).

As described above, the polymers may be functionalised and cross-linked on addition of the additive.

The number average molar mass, $M_n$, of the linear or branched polymers P1, P1', or P2, i.e. before cross-linking, is preferably between 2000 g/mol and 2500000 g/mol, more preferably between 5000 g/mol and 750000 g/mol and still more preferably between 10000 g/mol and 400000 g/mol.

The dispersity, $D=M_w/M_n$, of the linear or branched polymers P1, P1', or P2, i.e before cross-linking, is preferably between 1.01 and 15, more preferably between 1.03 and 10 and still more preferably between 1.05 and 7.5.

In the invention, the molar ratio of [repetition units of polymer P1 or P1' not containing pending imine or aldehyde functions]/[repetition units of polymer P1 or P1' containing a pending imine function+repetition units of polymer P1 or P1' containing a pending aldehyde function] is preferably between 0.01 and 1000, more preferably between 0.1 and 250, and still more preferably between 1 and 100. "Pending imine or aldehyde functions" means here either an imine or aldehyde function or a function that enables the grafting of such an imine or aldehyde function.

The molar ratio [compound of formula (I)]/[repetition units of polymer P1 or P1' containing a pending imine function+repetition units of polymer P1 or P1' containing a pending aldehyde function] is preferably between 5 and 0.001, more preferably between 1 and 0.005, and still more preferably between 0.5 and 0.01. "Pending imine or aldehyde functions" means here either an imine or aldehyde function or a function that enables the grafting of such an imine or aldehyde function.

In the invention, the molar ratio of [repetition units of polymer P2 not containing pending imine or aldehyde functions]/[repetition units of polymer P2 containing a pending imine function+repetition units of polymer P2 containing a pending aldehyde function] is preferably between 0.01 and 1000, more preferably between 0.1 and 250, and still more preferably between 1 and 100.

The molar ratio [repetition units of polymer P2 containing a pending imine function+repetition units of polymer P2 containing a pending aldehyde function]/[repetition units of polymer P1 or P1' containing a pending imine function+repetition units of polymer P1 or P1' containing a pending aldehyde function] is preferably between 2500 and 0.0004, more preferably between 250 and 0.004, and still more preferably between 100 and 0.01. "Pending imine or aldehyde functions" means here either an imine or aldehyde function or a function that enables the grafting of such an imine or aldehyde function.

The physical and chemical properties of the polymers of the invention depend strongly on the compounds used, in particular on the polymers P1 and P1', and if applicable P2.

Nevertheless, starting from a thermoplastic polymer P1 or P1', the compositions according to the invention combine the properties of a thermoplastic polymer with those of a thermoset. In particular, the compositions according to the invention are insoluble like a thermoset but may be recycled and/or reshaped at a temperature higher than the glass transition temperature (Tg) or the melting temperature (Tf) of the polymer P1 or P1', if applicable P2, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C., without suffering destruction or degradation of the structure, and that can be recycled without notable loss of their mechanical properties.

The compositions according to the invention have the advantage of showing thermosetting and thermoplastic properties. In particular, the compositions according to the invention have at least one, more preferably several, still more preferably all, of the following properties:
 thermal stability
 three-dimensional network, meaning that the polymer can be as insoluble as a thermoset
 polymer offcuts can be reused
 reshaping at a temperature higher than the glass transition temperature (Tg) or the melting temperature (Tf), preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

once cooled, it does not flow more than the reference polymer increase in chemical resistance malleable at high temperature possibility to reshape the polymer of the invention ability to relax all or some of the stresses present in the material objects may be manufactured by injection from these compositions objects may be manufactured by extrusion from these compositions objects may be manufactured by pressure moulding from these compositions objects may be manufactured by thermoshaping from these compositions objects may be manufactured by solvent casting from these compositions objects manufactured with these compositions may be repaired objects manufactured with these compositions may be welded objects manufactured with these compositions may be recycled Degradable: degradation of the polymer leads to linear or branched polymer chains that may be reused.

When they are in the form of liquid formulations, the cross-linked polymer compositions according to the invention, preferably compositions forming a network of cross-linked linear or branched polymers, preferably show the remarkable property that they can be injected, notably through a syringe. Depending on the level of cross-linking of the cross-linked linear or branched polymer networks, the cross-linked polymer compositions according to the invention are injectable, notably through a syringe, while forming a network of cross-linked polymers that, when swollen by a solvent, preferably water, can support its own weight and will not collapse on the scale of 30 seconds, preferably 1 minute, more preferably 2 minutes, still more preferably 5 minutes, still more preferably 10 minutes, still more preferably 30 minutes, still more preferably 1 hour, still more preferably 2 hours, still more preferably 4 hours, still more preferably 6 hours, still more preferably 8 hours, so more preferably 12 hours, still more preferably 1 day, without application of a strain.

When they are in the form of liquid formulations, the cross-linked linear or branched polymer networks according to the invention preferably show the property of self-agglomeration when they are left in contact.

The level of cross-linking of the cross-linked polymer compositions according to the invention, preferably the compositions in the form of liquid formulations forming cross-linked networks of linear or branched polymers, maybe modulated by addition of free monofunctional aldehydes and/or of free monofunctional imines and/or of compounds of formula (I), and/or of linear or branched polymers P2. Such a modulation of the cross-linking density may enable the release of molecules and/or polymers in the formulation containing the cross-linked polymer compositions according to the invention. The following are among the non-limiting examples of molecules or polymers that could be released: active substances, proteins, nucleic acids, amino acids, vitamins, flavours, catalysts, chemical reagents, pigments or other additives. The modulation of the cross-linking degree may be carried further to perform uncrosslinking.

The cross-linked polymers of the invention, preferably the cross-linked polymer networks of the invention, including assembled compositions of the invention, can be uncrosslinked, and thus recycled, by addition of a compound (small molecule or polymer) comprising a primary amine function. The compound is preferably a monofunctional primary amine, in which the nitrogen atom of the amine function is linked to the carbon atom of an aliphatic group. The cross-linked polymers of the invention, preferably the cross-linked polymer networks of the invention, can be uncrosslinked, and thus recycled, using water under pressure, for example in a autoclave. The cross-linked polymers of the invention, preferably the cross-linked polymer networks of the invention, including assembled compositions of the invention, can be uncrosslinked, and thus recycled, by addition of a compound (small molecule or polymer) comprising an aldehyde function. Preferably, the aldehyde function is linked to the carbon atom of an aryl or heteroaryl group. The compound is preferably a monofunctional aldehyde. The cross-linked polymers of the invention, preferably the cross-linked polymer networks of the invention, including assembled compositions of the invention, can be uncrosslinked, and thus recycled, by addition of a compound (small molecule or polymer) comprising an imine function. Preferably, the carbon atom of the imine function is linked to the carbon atom of an aryl or heteroaryl group. The compound is preferably a monofunctional imine.

When the modulation of the cross-linking degree is carried out to perform uncrosslinking of the cross-linked polymers of the invention, preferably of the cross-linked polymer networks of the invention, including assembled compositions of the invention, the compound used to modulate the cross-linking density, preferably a monofunctional aldehyde where the aldehyde function is linked to the carbon atom of an aryl or heteroaryl group, preferably a monofunctional imine where the carbon atom of the imine function is linked to the carbon atom of an aryl or heteroaryl group, preferably water under pressure, for example in a autoclave, preferably a primary amine in which the nitrogen atom is linked to the carbon atom of an aliphatic group, is used in large excess as compared to the imine cross-links present in the cross-linked polymers of the invention, preferably of the cross-linked polymer networks of the invention, including assembled compositions of the invention. By large excess, it should be understood that the molar ratio of [compound used to modulate the cross-linking density in order to perfrom uncrosslinking]/[cross-links containing imine functions] is preferably greater than 50, more preferably greater than 100, more preferably greater than 150, more preferably greater than 200, more preferably greater than 500, and still more preferably greater than 1000.

The composition according to the invention can also include loads and/or fillers and/or additives. The loads and/or fillers and/or additives are in particular those normally used by the person skilled in the art.

Furthermore, the composition can include, in the mixture or in the network, (an)other compatible polymer(s). The person skilled in the art knows how to choose such a polymer.

The polymer network compositions including at least one polymer network whose composition has been described above may also include: one or more polymers, pigments, colourants, blueing agents, fillers, plastifiers, impact modifiers, fibres, flame retardants, antioxidants, lubricants, wood, glass and metal.

Among the polymers that can be mixed with the compositions all polymer networks of the invention, examples include elastomers, thermosets, thermoplastic elastomers and impact-resistant polymers.

The term "pigments" designates coloured particles that are insoluble in composition or in the polymer network among the pigments that may be the invention, titanium dioxide, carbon black, carbon nanotubes, metallic particles, silica, metal oxides, metallic sulfites or any other mineral pigments may be cited. Other pigments that may be mentioned are phthalocyanines, anthraquinones, quinacridones, dioxazines, azo dyes or any other organic pigment and natural pigments (madder, indigo, rose madder, carmine, etc.) and pigment mixtures. The pigments can represents between 0.05% and 70% of the composition of the formulation.

The term "colourants" designates molecules that are soluble in the composition all the polymer network and have the ability to absorb all or some of the visible light rays.

The term "blueing agent" designates a molecule that absorbs ultraviolet light rays and then re-emits this energy by fluorescence in the visible spectrum. Blueing agents are notably used to give a certain whiteness.

Examples of fillers that may be used in the compositions or polymer networks of the invention are: silica, clays, calcium carbonate, carbon black and kaolins.

Examples of fibres that may be used in the compositions or polymer networks of the invention are: glass fibre, carbon fibre, polyester fibre, polyamide fibre, aramide fibre, polyethylene fibre, cellulose fibre and nano-cellulose. Organic fibres (linen, hemp, sisal, bamboo, etc.) may also be envisaged.

The fact that thermally conducting pigments, colourants or fibres may be present in the compositions or polymer networks of the invention may be used to facilitate the heating of an object of obtained from the compositions or polymer networks of the invention and so to enable the manufacture, transformation recycling of an article obtained from these compositions or polymer networks of the invention as described below. As non-limiting examples of thermally conducting pigments, fibres or fillers, the following may be given: aluminium nitride (AlN), boron nitride (BN), MgSiN2, silicon carbide (SiC), graphite, graphene, carbon nanotubes, carbon fibres, metallic powders and stared combinations.

The presence in the compositions or polymer networks of the invention of pigments, colourants or fibres capable of absorbing radiation may be used to ensure the heating of an article obtained from these compositions or polymer networks of the invention by means of a radiation source, for example a laser. The presence in the compositions or polymer networks of the invention of electrically conducting pigments fibres or fillers such as carbon black, carbon nanotubes, carbon fibres, metallic powders, or magnetic particles, may be used to ensure the heating of an article obtained from these compositions or polymer networks of the invention by the Joule effect or by microwaves. Such heating procedures may enable the manufacture, transformation or recycling of an article obtained from the compositions or polymer networks of the invention as described below. Electrically conducting loads also enable electrostatic charges to be evacuated from the material or enable electrostatic painting It has been discovered that imine-imine metathesis reactions catalysed by an aldehyde are the most rapid. To the inventors' knowledge, the use of aldehyde to catalyse imine-imine metathesis reactions has not been previously described.

It has also been discovered that the imine and aldehyde functions can exchange their substituents according to the following reaction:

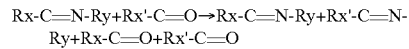

To the inventors' knowledge, the imine-aldehyde exchange reaction has not been previously described.

Preferably, the aldehyde used to catalyse the imine metathesis is an aromatic aldehyde, that is a molecule in which the aldehyde function is carried by an aryl or heteroaryl group.

Preferably, the carbon atom of the imine functions and the carbon atom of the aldehyde functions are linked directly to an aryl or heteroaryl group.

Preferably, the carbon atom of the imine functions and the carbon atom of the aldehyde functions are linked directly to the alkene function of a terpenoid group.

Another object of the invention is therefore the use of aldehyde to catalyse imine-imine metathesis reactions and imine-aldehyde exchange reactions.

The aldehyde may be a free monofunctional aldehyde, a polyaldehyde or a pending aldehyde function of a polymer of the composition.

Another object of the invention is a process for preparation of the compositions according to the invention. This process preferably comprises the following steps:

Choosing a linear or branched polymer P1 with side-groups carrying:
  aldehyde functional groups; or
  imine functional groups linked to the polymer by the carbon atom; or
  imine functional groups linked to the polymer by the nitrogen atom; or
  aldehyde functional groups and imine functional groups linked to the polymer by the carbon atom;
Choosing at least one additive carrying at least two imine and/or aldehyde functional groups that are capable of reacting with the side groups of the polymer P1 to form a cross-linked polymer composition, preferably a cross-linked network, containing links and cross-links that are exchangeable by aldehyde-imine exchange reactions and/or by imine-imine exchange reactions;
mixing, in the molten state or in solution, said polymer P1, said additive and if applicable a free monofunctional aldehyde to obtain the said composition.

The choice of substitutions and of the additive is made according to the description given above for compositions. A free monofunctional aldehyde or a free monofunctional imine, as described previously, may be added.

The process may include a previous step to prepare polymer P1', comprising copolymerisation, for example by radical routes, by polymerisation by coordination, by ring-opening polymerisation, by polyaddition or by polycondensation, of a precursor monomer of P1' and a monomer carrying a imine or aldehyde functional group.

The process may include a previous step to prepare polymer P1, comprising grafting of pending aldehyde and/or imine functions to a linear or branched polymer.

Another process according to the invention preferably comprises the following steps:

choosing at least one linear or branched polymer P1' containing functions enabling grafting, choosing a combination of molecules of which the molecules comprise at one end a functional group enabling covalent binding of the molecule to the polymer P1' and at another end a functional group chosen from among an imine function linked by its carbon atom to the rest of the molecule (A), an imine function linked by its nitrogen atom to the rest of the molecule (C), or an aldehyde function (B), and/or molecules comprising at two of their extremities functional groups enabling covalent binding of the molecule to the polymer P1' and between these two extremities an imine function (D), the combination enabling grafting and the creation of pending links and cross-links that are exchangeable by aldehyde-imine exchange reactions and/or by imine-imine exchange reactions;

mixing, in the molten state or in solution, said polymer P1, said combination and if applicable a free monofunctional aldehyde to obtain the said composition.

The choice of substitutions and of the composition is made according to the description given above for compositions. A free monofunctional aldehyde or a free monofunctional imine, as described previously, may be added.

The process may comprise a previous step to prepare polymer P1, including copolymerisation, for example by radical routes, by polymerisation by coordination, by ring-opening polymerisation, by polyaddition or by polycondensation, of a precursor monomer of P1 and a monomer carrying a functional group enabling subsequent grafting of aldehyde and/or imine functions.

The process may include a previous step to prepare polymer P1, comprising grafting of pending functions enabling the grafting of aldehyde and/or imine functions to a linear or branched polymer.

Another object of the invention is a material obtained from the composition according to the invention.

Another object of the invention is a preparation process of a material according to the invention, including the following steps:

Preparation of a composition according to the invention;
Shaping of the composition obtained therefrom.

The concept of shaping also includes the compounding of the composition in the form of granules or powder, for example in the preparation of finished products. The shaping may also be carried out by processes known to the person skilled in the art for the shaping of thermoplastic or thermosetting polymers. Notably, the processes of moulding, compression, injection, extrusion and thermoforming may be mentioned. Before having the form of the finished object, the material will usually be in the form of granules or powder.

Advantageously in the process according to the invention the preparation and forming steps may be concomitant. In particular, in the processes described above, it is possible to functionalise and cross-link a polymer, for example by extrusion or injection during its shaping or in a compounding step.

Another object of the invention is a process for recycling a material obtained including the following successive steps: a) reduction of the material to a powder by mechanical grinding; b) transformation of the particles from step a) by applying a mechanical stress to the particles at a temperature (T) higher than the glass transition temperature (Tg) or the melting temperature (Tf) of the polymer P1 or P1', if applicable P2, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

Another object of the invention is a formulation comprising a composition according to the invention.

Another object of the invention is the use of an additive such as defined above, or the combination such as defined above, in the presence of a linear or branched polymer P1 or P1' for the formation of a composition comprising cross-linked polymers, preferably a cross-linked network, containing pending links and cross links that are exchangeable by aldehyde-imine exchange reactions and/or imine-imine exchange reactions. The nature of the additive or the combination is chosen as a function of the polymer P1 or P1', in particular its functionalisation, according to the criteria detailed above.

A free monofunctional aldehyde or a free monofunctional imine may also be added to the composition. Preferably, the carbon atom of the imine function and the carbon atom of the aldehyde function are linked directly to an aryl or heteroaryl group.

Preferably, the carbon atom of the imine function and the carbon atom of the aldehyde function are linked directly to the alkene function of a terpenoid group.

Another object of the invention is a process to modify the rheology of a composition, such as an oil or a paint, including the said polymer P1 or P1' by addition of an additive according to the invention or a composition according to the invention to the composition. The rheology is modified by choosing the concentration of the said additive or composition.

The nature of the additive or the combination is chosen as a function of the polymer P1 or P1', in particular its functionalisation, according to the criteria detailed above.

A free monofunctional aldehyde or a free monofunctional imine may also be added to the composition. Preferably, the carbon atom of the imine function and the carbon atom of the aldehyde function are linked directly to an aryl or heteroaryl group.

Preferably, the carbon atom of the imine function and the carbon atom of the aldehyde function are linked directly to the alkene function of a terpenoid group.

Another object of the invention are combinations to cross-link linear or branched polymers, preferably P1 or P1', said combinations being chosen from among the combinations including:

A free monofunctional aldehyde+compound of formula (I), as defined previously;
A free monofunctional aldehyde+polymer P2, as defined previously;

A and/or B+C, A, B and C being as defined previously, and optionally a free monofunctional aldehyde as defined previously;

A and/or B and/or C+D, A, B, C and D being as defined previously, and optionally free monofunctional aldehyde as defined previously;

A and/or B+compound of formula (I) in which Z and $W_1$ are N, and optionally free monofunctional aldehyde as defined previously; or C+compound of formula (I) in which Z and $W_1$ are a carbon atom, and optionally free monofunctional aldehyde as defined previously.

In the first two cases, the linear or branched polymers must have exchangeable pending imine and/or aldehyde functions.

A, B, C and D are as defined previously.

The compositions may also comprise a free monofunctional aldehyde or a free monofunctional imine. Preferably, the carbon atom of the imine function and the carbon atom of the aldehyde function are linked directly to a terpenoid, aryl or heteroaryl group. Preferably, when the aldehyde function is carried by a terpenoid group, the aldehyde function is linked directly to an alkene function of the terpenoid.

The following examples illustrate the invention and are not limiting.

A. Syntheses of Monomers, of Functionalization Compounds and Compound of Formula (I)

A.1. Aldehyde Compound: M1

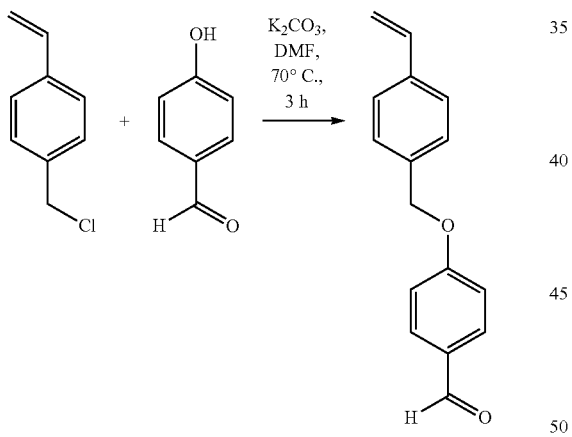

p-Chloromethylstyrene (6.63 g, 43.4 mmol), 4-hydroxybenzaldehyde (6.25 g, 51.1 mmol) and potassium carbonate ($K_2CO_3$) (17.7 g, 127.9 mmol) are mixed in a 250 mL flask containing 75 mL of dimethylformamide (DMF). The mixture is stirred under nitrogen for 3 hours at 70° C. The mixture is then poured into 500 mL water, and extracted three times with 150 mL of ethyl acetate. The combined organic phases are washed with brine 0.5 M (3×150 mL), dried over magnesium sulfate ($MgSO_4$) and the mixture is concentrated under reduced pressure to yield a slightly yellow solid. The solid is introduced in 100 mL of heptane and the mixture is stirred at 50° C. for 1 hour. The solid is filtered and dried to yield the aldehyde monomer C as a white solid (8.7 g, 36.3 mmol, 84%).

$^1$H NMR (CDCl$_3$, 400 MHz) δ: 9.89 (s, 1H), 7.84 (d, 2H, J=8.8 Hz), 7.42 (m, 4H), 7.07 (d, 1H, J=8.8 Hz), 6.73 (dd, 1H, J=17.6 Hz, 10.8 Hz), 5.77 (d, 1H, J=17.6 Hz), 5.28 (d, 1H, J=10.8 Hz), 5.14 (s, 2H).

GC MS: 97%, ( ) m/z: [M] Calculated for C16H14O2: 238.0944. Found: 238.20.

A.2. Imine Compound: M2

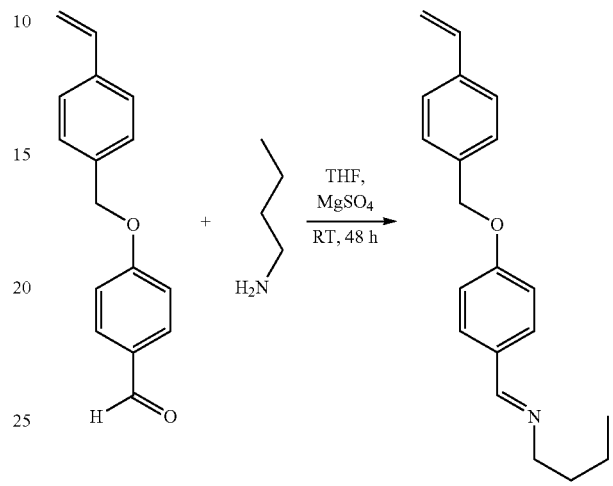

The aldehyde monomer C (5 g, 21 mmol) and n-butylamine (7.67 g, 105 mmol) are dissolved in 40 mL of tetrahydrofuran (THF). Magnesium sulfate anhydrous is added and the reaction mixture is stirred for 48 hours at room temperature (RT). The mixture is filtered and concentrated under reduced pressure to yield the imine monomer B as white solid (5.85 g, 19.9 mmol, 95%).

$^1$H NMR (CDCl$_3$, 400 MHz) δ: 8.20 (s, 1H), 7.66 (d, 2H, J=8.8 Hz), 7.41 (m, 4H), 6.99 (d, 2H, J=8.8 Hz), 6.73 (dd, 1H, J=17.6 Hz, 10.8 Hz), 5.77 (d, 1H, J=17.6 Hz), 5.27 (d, 1H, J=10.8 Hz), 5.09 (s, 2H), 3.58 (t, 2H, J=7.2 Hz), 1.67 (m, 2H), 1.38 (m, 2H), 0.95 (t, 3H, J=7.2 Hz).

$^{13}$C NMR (CDCl$_3$, 100 MHz) δ: 160.5, 160.0, 137.4, 136.4, 136.2, 129.6, 129.5, 127.8, 126.5, 114.9, 114.2, 69.8, 61.4, 32.2, 20.5, 14.0

GC MS: 96%, ( ) m/z: [M] Calculated for $C_{20}H_{30}NO$ 293.4027. found 293.25.

A.3. Compound with the Formula (I): CF1

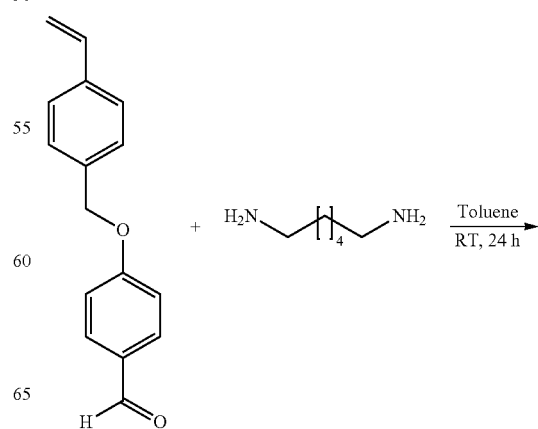

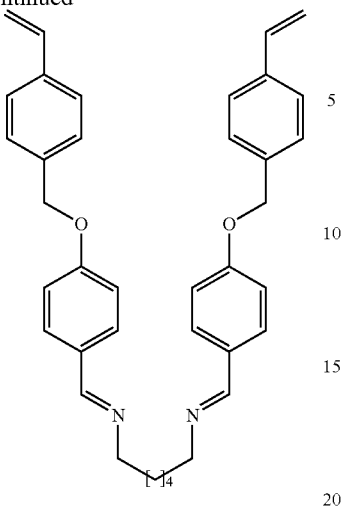

The aldehyde monomer C (12.0 g, 50.34 mmol) and 1,6-hexanediamine (5.83 g, 50.34 mmol) are mixed in 150 mL of toluene and the mixture is stirred for 24 hours at RT. The white precipitate is filtered, washed three times with 150 mL methanol and dried to yield the cross-linking agent $D_1$ as a white solid (9.5 g, 17.1 mmol, 70%).

$^1$H NMR (CDCl$_3$, 400 MHz) δ: 8.19 (s, 2H), 7.66 (d, 4H, J=8.8 Hz), 7.41 (m, 8H), 6.99 (d, 4H, J=8.8 Hz), 6.73 (dd, 2H, J=17.6 Hz, 10.8 Hz), 5.77 (d, 2H, J=17.6 Hz), 5.27 (d, 2H, J=10.8 Hz), 5.08 (s, 4H), 3.57 (t, 4H, J=7.2 Hz), 1.70 (m, 4H), 1.41 (m, 4H).

$^{13}$C NMR (CDCl$_3$, 100 MHz) δ: 160.7, 160.1, 137.5, 136.4, 136.2, 129.6, 127.7, 126.5, 114.9, 114.3, 69.8, 61.7, 31.0, 27.2.

A.4. Composé de Formule (I): CF2

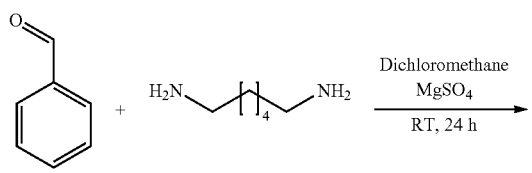

Benzaldehyde (2.05 equivalents) and 1,6-hexanediamine (1 equivalent) are mixed in dichloromethane (2 mL per mol of 1,6-hexanediamine) and MgSO$_4$ (3 equivalents) is added. The reaction mixture is stirred at RT for 24 hours, filtered and concentrated under reduced pressure to yield the cross-linking agent $D_2$ as a yellow oil (98%, in the presence of 7 mol % benzaldehyde).

$^1$H NMR (CDCl$_3$, 400 MHz) δ: 8.26 (s, 1H), 7.72 (m, 2H), 7.38 (m, 3H), 3.63 (t, J=6.8 Hz, 2H), 1.74 (m, 2H), 1.42 (m, 2H).

$^{13}$C NMR (CDCl$_3$, 100 MHz) δ: 161.2, 136.2, 130.4, 128.6, 128.1, 62.0, 30.8, 27.2.

A.5. Imine Compound: M3

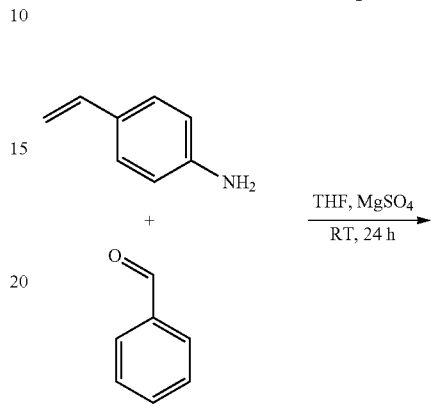

Benzaldehyde (0.9 mL, 8.8 mmol) and 4-vinylaniline (1 g, 8.4 mmol) are mixed in 20 mL of tetrahydrofuran and MgSO$_4$ (1 g) is added. The reaction mixture is stirred for 24 hours at RT, filtered and concentrated under reduced pressure to yield the cross-linking agent $B'_1$ (90%, in the presence of 5 mol % of benzaldehyde).

$^1$H NMR (CDCl$_3$, 400 MHz) δ: 8.48 (s, 1H), 7.93-7.90 (m, 2H), 7.50-7.45 (m, 5H), 7.23-7.20 (m, 2H), 6.75 (dd, J=17.6 Hz, 10.8 Hz, 1H), 5.76 (d, J=17.6 Hz, 1H), 5.25 (d, J=10.8 Hz, 1H).

A.6. Imine Compound: M4

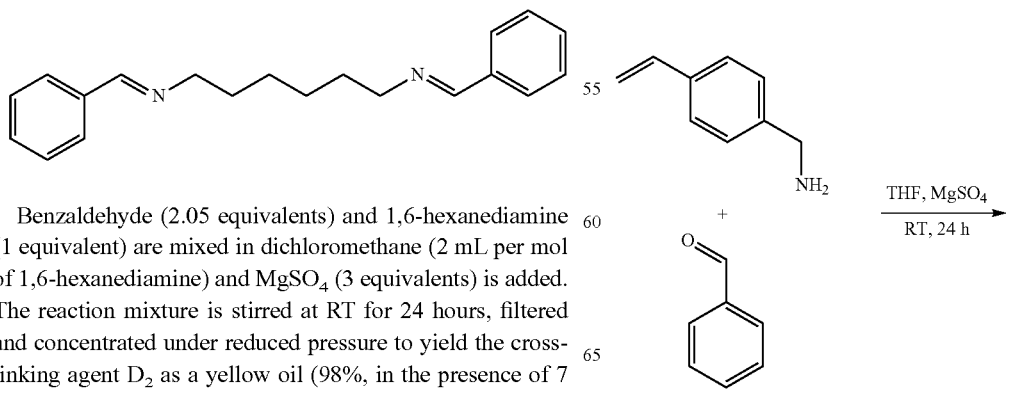

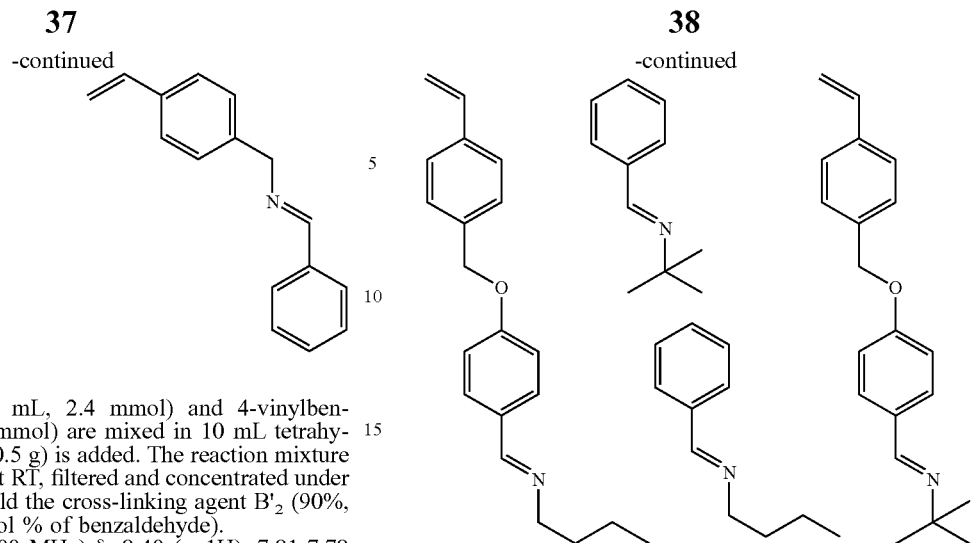

Benzaldehyde (0.24 mL, 2.4 mmol) and 4-vinylbenzylamine (0.3 g, 2.25 mmol) are mixed in 10 mL tetrahydrofuran and MgSO$_4$ (0.5 g) is added. The reaction mixture is stirred for 24 hours at RT, filtered and concentrated under reduced pressure to yield the cross-linking agent B'$_2$ (90%, in the presence of 5 mol % of benzaldehyde).

$^1$H NMR (CDCl$_3$, 400 MHz) δ: 8.40 (s, 1H), 7.81-7.78 (m, 2H), 7.44-7.31 (m, 7H), 6.73 (dd, J=17.6 Hz, 10.8 Hz, 1H), 5.74 (d, J=17.6 Hz, 1H), 5.25 (d, J=10.8 Hz, 1H), 4.83 (s, 2H).

B. Kinetic Studies of Exchange Reactions

These experiments aim at evaluating the conditions (time, temperature, catalyst) under which imine-imine, imine-amine and imine-aldehyde exchanges can be observed.

Kinetic Studies:

Stoichiometric quantities of imine compounds, amines or aldehydes are mixed in CDCl$_3$ and $^1$H-NMR spectra are recorded regularly. The compounds are mixed from stock solutions and the overall concentration of the two initial exchanging reactants is fixed at 0.071 mol/L (0.05 mmol/0.7 mL).

General Mixing Procedure:

CDCl$_3$ is introduced in the NMR tube and the reactants are added from their stock solutions using a micro syringe. The tube is hermetically sealed and shaken carefully before starting the NMR analysis. The time elapsed between the end of the addition of all compounds and the first NMR spectrum recorded is ca. 3:30 minutes. For experiments at elevated temperature, the NMR spectrometer is equilibrated at the respective temperature prior to sample addition. Room temperature during these experiments corresponds to 22.0 to 23.6° C. The following exchange reactions were studied:

Reaction scheme of the imine-imine metathesis reactions B.1, B.2, B.3, B.4, B.5

B.1. Uncatalyzed imine-imine metathesis at room temperature (RT)

B.2. Uncatalyzed imine-imine metathesis at 45° C.

B.3. Imine-imine metathesis in the presence of 10 mol % of amine (butylamine) at RT B.4. Imine-imine metathesis in the presence of 10 mol % of aldehyde (benzaldehyde) at RT B.5. Imine-imine metathesis in the presence of 10 mol % of aldehyde (benzaldehyde) at 45° C.

Reaction scheme of the imine aldehyde exchange reaction at RT B.6

B.6. Imine-aldehyde exchange reaction at RT

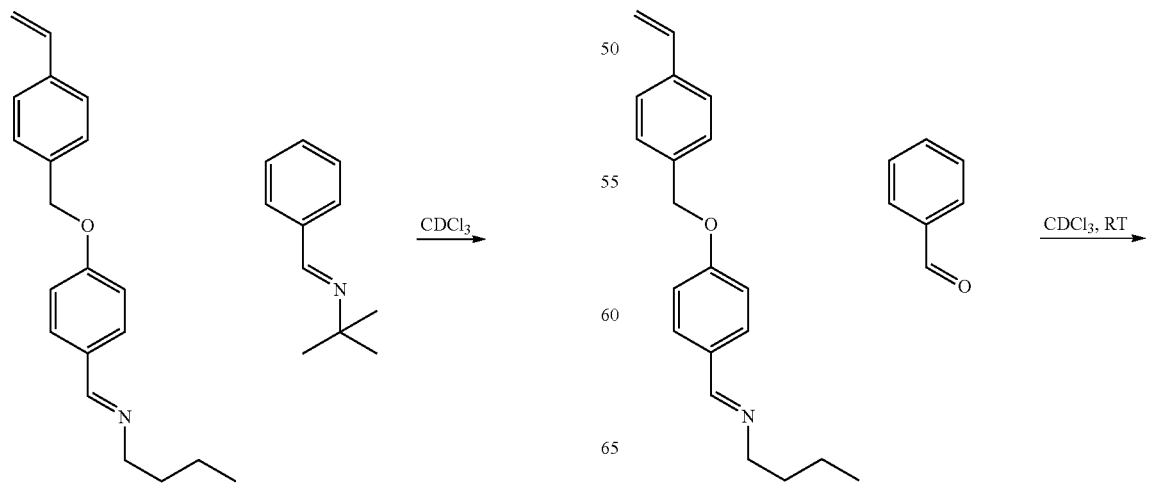

-continued

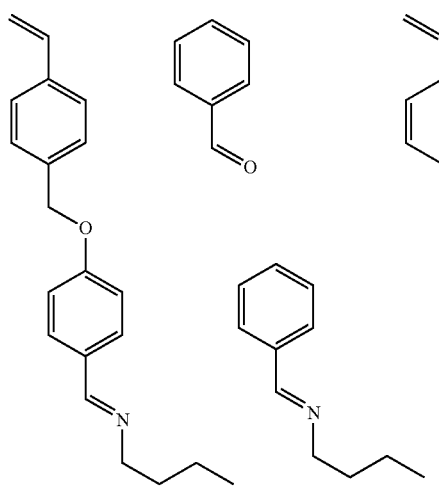

General Observations:

At the thermodynamic equilibrium, every compound should represent 25 mol % of the total amount of compounds (in the uncatalyzed experiment). The time required to form 15% of the two new compounds formed by metathesis or exchange reaction of the six studied reactions are given in the table below. This conversion threshold, which corresponds to a conversion of 60% towards the thermodynamic equilibrium, was chosen arbitrary to enable comparison of the different speeds of exchange.

TABLE 1

|  | Reaction: | | | | | |
| --- | --- | --- | --- | --- | --- | --- |
|  | 1 | 2 | 3 | 4 | 5 | 6 |
| Time [h] to generate 15% of N-n-butylbenzimine | 32.5 | 23 | 7.5 | 4.75 | 0.75 | 8.75 |
| Time [h] to generate 15% of N-tert-butylimine monomer | 32.5 | 23 | 12.5 | 4.75 | 0.75 | 8.75 |

The uncatalyzed imine-imine metathesis is the slowest exchange reaction of the studied exchange reactions. The addition of free aldehyde to imine-imine metathesis reaction accelerates the exchange reaction by a factor of 7 at RT and a factor of 30 at 45° C. To our knowledge, the use of aldehyde as catalyst for the metathesis of imines has not been described yet. Imine-aldehyde exchange reaction also proved to be faster than the uncatalyzed imine-imine metathesis by a factor of ca. 3.5.

C. Polymers P1 Syntheses

C.1. Example of Synthetic Procedure to Prepare a Polyaldehyde Polymer P1 by Conventional Radical Polymerization: P1a1

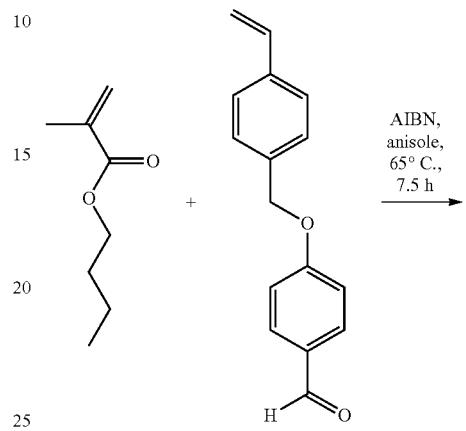

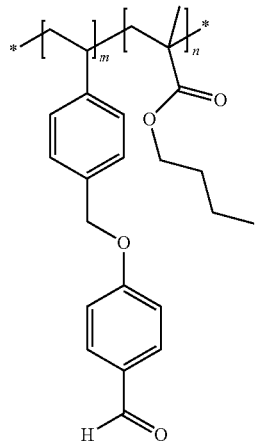

Butyl methacrylate (BMA) (11.4 g, 80.0 mmol), the aldehyde monomer M1 (5.0 g, 21.0 mmol) and azobisisobutyronitrile (AIBN) (27.6 mg, 0.168 mmol) are mixed in a Schlenk flask containing 3.8 mL of anisole. The resulting reaction mixture is bubbled with nitrogen for 30 minutes before being stirred at 65° C. for 7.5 hours. The polymerization is stopped by placing the Schlenk tube in an ice bath at 0-2° C. The conversion of monomers was found to be 55% at the end of reaction. 3 mL of anhydrous THF are added to the mixture and the polymer is isolated via two successive precipitations into diethyl ether. The resulting colorless solid was dried under high vacuum at 100° C. over night. Size exclusion chromatography analysis (eluent THF, calibration PMMA) of the polymer gave an apparent molar mass $M_n$ of 430 000 g/mol and a dispersity Đ of 2.55.

C.2. Example of Synthetic Procedure to Prepare a Polyaldehyde Polymer P1 by Reversible Addition-Fragmentation Chain Transfer (RAFT) Polymerization: P1a0

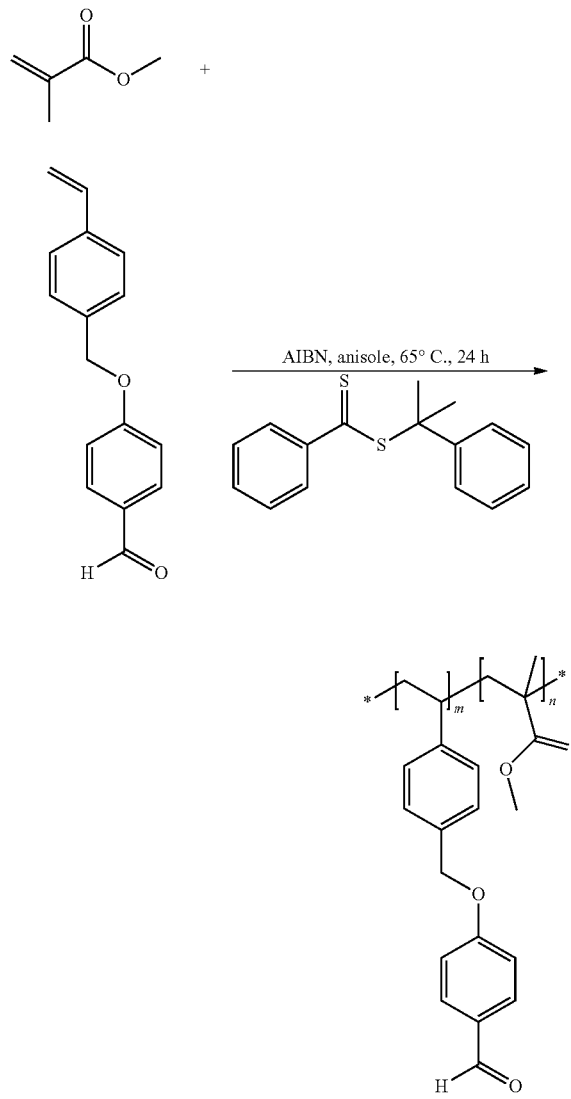

Methyl methacrylate (MMA) (3.36 g, 33.6 mmol), the aldehyde monomer C (2.0 g, 8.39 mmol), 2-phenyl 2-propyl benzodithioate (47.8 mg, 0.176 mmol) and AIBN (11.0 mg, 0.068 mmol) are mixed in a Schlenk flask containing 3.6 mL of anisole. The resulting reaction mixture is bubbled with nitrogen for 30 minutes before being stirred at 65° C. for 24 hours. The polymerization is stopped by placing the Schlenk tube in an ice bath at 0-2° C. The conversion of methyl methacrylate and aldehyde monomer C were found to be 84.4% and 92.3% respectively. The polymer is isolated via two successive precipitations into diethyl ether. The resulting slightly pink solid was dried under high vacuum at 50° C. for 2 hours. Size exclusion chromatography analysis (eluent THF, calibration PMMA) of the polymer gave an apparent molar mass $M_n$ of 23 200 g/mol and a dispersity Đ of 1.25.

C.3. Example of Synthetic Procedure to Prepare a Polyimine Polymer P1 by Reversible Addition-Fragmentation Chain Transfer (RAFT) Polymerization: P1i

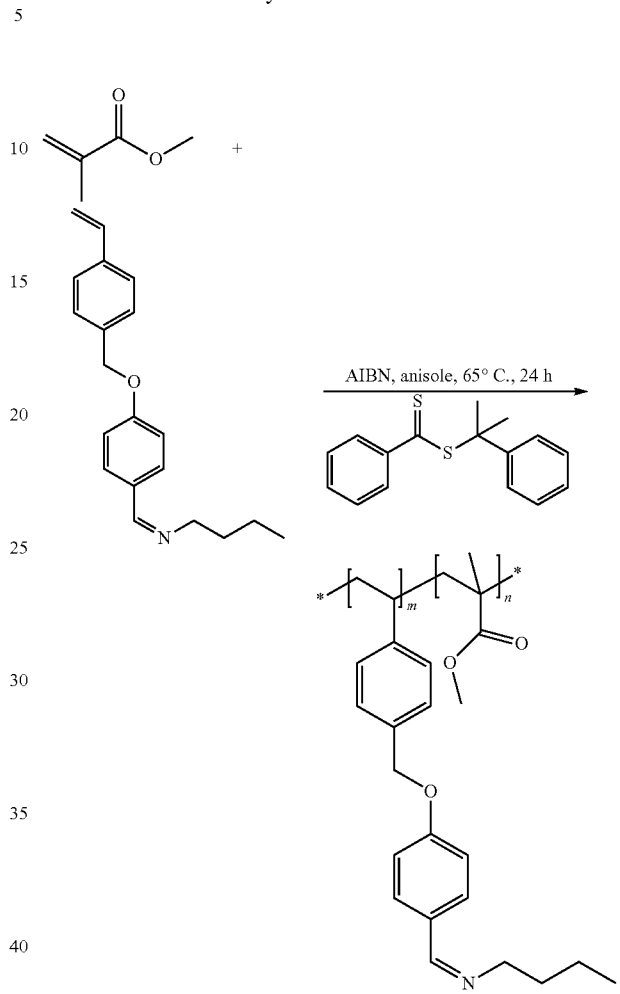

Methyl methacrylate (MMA) (4.09 g, 40.9 mmol), the imine monomer B (3 g, 10.2 mmol), 2-phenyl 2-propyl benzodithioate (55.7 mg, 0.2 mmol) and AIBN (13.4 mg, 0.08 mmol) are mixed in a Schlenk flask containing 1.5 mL of anisole. The resulting reaction mixture is bubbled with nitrogen for 30 minutes before being stirred at 65° C. for 24 hours. The polymerization is stopped by placing the Schlenk tube in an ice bath at 0-2° C. The conversion of methyl methacrylate and imine monomer B were found to be 84.3% and 99.4%, respectively. The polymer is isolated via two successive precipitations into diethyl ether. The resulting slightly pink solid was dried under high vacuum at 50° C. for 2 hours. Size exclusion chromatography analysis (eluent THF, calibration PMMA) of the polymer gave an apparent molar mass $M_n$ of 53 900 g/mol and a dispersity Đ of 1.52.

C.4. Polyaldehyde Polymers Prepared by Conventional or RAFT Polymerization Following Procedures C.1 and C.2

The following table presents the synthesis of polyaldehyde polymers P1 according to the procedures described in C.1 and C.2. The temperature and the initial volume fraction of monomers/anisole were not changed. Except for P1a1, for which the comonomer M was butyl methacrylate (BMA), the comonomer M is always methyl methacrylate. The time of polymerization, the initial ratios $[M]_0/[M1]_0$ and $[M+M1]_0[PPBDT]_0/[AIBN]_0$ may vary and are reported in the following table.

TABLE 2

| Ref | $[M]_0/[M1]_0/$ $[PPBDT]_0/$ $[AIBN]_0$ | Reaction time (h) | Monomer conversion (%) | Mn (kg/mol) | Đ | M/M1 in the polymer |
|---|---|---|---|---|---|---|
| P1a1[a] | 3.8/1/—/0.008 | 7.5 | 55 | 430 | 2.55 | 2.9 |
| P1a2[a] | 20/1/—/0.034 | 7.5 | 38 | 164 | 2.07 | 14 |
| P1a3[a] | 3/1/—/0.008 | 7.5 | 53 | 356 | 2.6 | 2.0 |
| P1a4[b] | 800/200/1/0.4 | 16 | 39 | 57 | 1.17 | 4.4 |
| P1a5[b] | 800/200/1/0.4 | 20 | 65 | 57 | 1.29 | 3.4 |
| P1a6[b] | 2388/597/1/0.4 | 16 | 40 | 131 | 1.20 | 3.7 |
| P1a7[b] | 800/200/1/0.4 | 24 | 63 | 59 | 1.20 | 3.7 |

[a]via conventional radical polymerization;
[b]via RAFT polymerization;

D. Formation and Characterization of Cross-Linked Polymer Networks Containing Pending Bonds Exchangeable Via Imine-Imine and/or Aldehyde-Imine Exchange Reactions

D.1. Example of Liquid Formulation, Solubility and <<Degradability>> Tests of a Cross-Linked Polymer Network The following example represents an example of liquid formulation and illustrates the formation in solution of a cross-linked polymer network according to the invention and the possibility to degrade the cross-linked polymer network.

0.5 g of polymer P1a3 are dissolved in 2.5 mL of anhydrous THF and 0.01 mL (0.03 mmol) of the formula (I) compound CF2 are added. After 8 hours at RT a cross-linked polymer network swollen with THF is obtained. This polymer network was kept at RT in THF for 3 days and remained insoluble. The gel is then cut in two equally sized pieces and each of them is placed in 5 mL of anhydrous THF. 1 mL (9.9 mmol) of benzaldehyde is added to one of the mixtures, while no chemicals is added to the other mixture. After 24 hours at RT, the cross-linked polymer network in the anhydrous THF solution in which no chemicals was addeds is still insoluble, whereas the cross-linked polymer network in the THF solution containing 1 mL of benzaldehyde is completely dissolved.

D.2. Example of Solid Formulation, Processing Via Compression Molding and Solubility Tests of a Cross-Linked Polymer Network The following example represents an example of solid formulation and illustrates the formation of a cross-linked polymer network according to the invention, the processing via compression molding and its insolubility in a good non-reactive solvent of the polymer that constitutes the cross-linked network.

Formation and Processing Via Compression Molding of a Cross-Linked Polymer Network 10.0 g of polymer P1a1 are dissolved in 40 mL of anhydrous THF and 73 mg of formula (I) compound CF2 are added. The reaction mixture is stirred at RT for 30 minutes before being concentrated under reduced pressure at 100° C. over night. The resulting powder is compression molded during 1 hour at 150° C. under a pressure of 3-5 tons. The resulting cross-linked polymer network is named N1.

Solubility Tests at Room Temperature in THF of the Cross-Linked Polymer Network N1

A sample of the cross-linked polymer network N1 with a mass of ca 75 mg is placed in 10 mL of anhydrous THF and swollen for 16 hours at room temperature. The swelling ratio (SR) and the soluble fraction (SF) of the cross-linked polymer network N1 are calculated. This test was performed on two samples.

Swelling ratio=(mass of the swollen sample−mass of the dried sample after swelling)/(mass of the dried sample after swelling)

Soluble fraction=(mass of the sample before swelling−mass of the dried sample after swelling)/(mass of the dried sample after swelling)

TABLE 3

| Ref | Swelling ratio | Soluble fraction (%) |
|---|---|---|
| 1 | 7.4 | 5 |
| 2 | 7.4 | 4 |

Solubility Tests at 120° C. in Anisole of the Cross-Linked Polymer Network N1

A sample of the cross-linked polymer network N1 (600 mg) is placed in 100 mL anisole and the mixture is heated to 120° C. for 16 hours. After 16 hours, the sample was highly swollen (its dimensions increased by a factor of ca 2.5) while keeping its initial shape.

D.3. Formation and Processing Via Compression Molding of Cross-Linked Polymer Networks The following table presents the cross-linked polymer networks obtained from polyaldehyde polymers prepared via conventional radical polymerization or RAFT polymerization following procedures C.1 and C.2. The cross-linked polymer networks are prepared via the procedure described in D.2 for N1. The only difference is the quantity of formula (I) compound CF2 used per 10 g of polymer P1aX.

TABLE 4

| Ref | Polymer | quantity of compound with the formula (I) CF2 (mg) |
|---|---|---|
| N1 | P1a1 | 73 |
| N2 | P1a2 | 100 |
| N3 | P1a3 | 120 |
| N4 | P1a4 | 94 |
| N5 | P1a4 | 476 |
| N6 | P1a5 | 287 |
| N7 | P1a6 | 48 |
| N8 | P1a7 | 86 |

D.4. Example of Solid Formulation, Processing Via Compression Molding, Insolubility and Recycling Tests of a Cross-Linked Polymer Network The following example presents an example of solid formulation and illustrates the formation of a cross-linked polymer network according to the invention, its processing via compression molding and its insolubility in a good non-reactive solvent of the polymer of the polymer that constitutes the cross-linked network and its ability to be recycled.

Formation, Processing Via Compression Molding of a Cross-Linked Polymer Network 10.0 g of polymer P1a6 are dissolved in 40 mL of anhydrous THF and 48 mg of formula (I) compound CF2 are added. The reaction mixture is stirred at RT for 30 minutes and is then concentrated under reduced pressure at 100° C. over night. The resulting powder is compression molded for 1 hour at 150° C. under a pressure of 3-5 tons. The resulting cross-linked polymer network is named N7.

Solubility Tests at Room Temperature in THF of the Cross-Linked Polymer Network N7

A sample of the cross-linked polymer network N7 with a mass somewhere between 30 mg and 140 mg is placed in 10 mL of anhydrous THF and swollen for 48 hours at room temperature. The swelling ratio (SR) and the soluble fraction (SF) of the cross-linked polymer network N7 are calculated. This test was performed on three or four samples each time.

Swelling ratio=(mass of the swollen sample−mass of the dried sample after swelling)/(mass of the dried sample after swelling)

Soluble fraction=(mass of the sample before swelling−mass of the dried sample after swelling)/(mass of the dried sample after swelling)

Recycling of the Cross-Linked Polymer Network N7

After the swelling tests, the samples are dried under high vacuum at 110° C. for 30 hours. The samples are grind into powder and compression molded for 1 hour at 150° C. under a pressure of 3-5 tons. The resulting samples were tested again for their insolubility before being recycled and tested a second and then a third time.

The results of swelling tests are presented in the table below.

TABLE 5

| Generation | Number of recycling cycles | Swelling ratio | Average swelling ratio | Soluble fraction (%) | Average swelling fraction(%) |
|---|---|---|---|---|---|
| 1 | 0 | 11.5 | 11.0 | 15.1 | 13.9 |
|   |   | 13.8 |      | 14.5 |      |
|   |   | 9.5  |      | 13.4 |      |
|   |   | 9.3  |      | 12.7 |      |
| 2 | 1 | 9.9  | 10.3 | 5.5  | 3.8  |
|   |   | 10.1 |      | 2.6  |      |
|   |   | 10.9 |      | 3.3  |      |
| 3 | 2 | 9.9  | 11.5 | 0.2  | 2.8  |
|   |   | 11.9 |      | 3.5  |      |
|   |   | 12.8 |      | 4.8  |      |
| 4 | 3 | 9.5  | 9.6  | −0.1 | −0.1 |
|   |   | 9.5  |      | −1.4 |      |
|   |   | 9.9  |      | 1.3  |      |

D.5. Physico-Chemical and Mechanical Characterization of Cross-Linked Polymer Networks Before and after Recycling The following examples illustrate the ability of the cross-linked polymer networks according to the invention to be recycled without significantly loss of their physico-chemical and mechanical properties.

Dynamic Mechanical Analysis (DMA) of the Cross-Linked Polymer Network N7 Before and after Recycling The samples were analyzed in tension film geometry on a TA Q800 instrument. Rectangular or dog-bone shaped samples were used. The samples were equilibrated at the respective temperature for 5 minutes before analysis. A preload force of 0.01 N and a temperature ramp of 3° C./min were applied. FIG. 4 represents the evolution of the elastic modulus (ordinate, MPa) as a function of temperature (abscissa, ° C.) for the cross-linked polymer network N7 not recycled (1$^{st}$ generation, triangle), for the cross-linked polymer network N7 recycled two times (3$^{rd}$ generation, cycle), for the cross-linked polymer network N7 recycled three times (4th generation, square). These analyses indicate that there are only very small variations of the elastic modulus of the cross-linked polymer network N7 after three recycling steps and that the elastic modulus does not decrease neither below nor above the Tg of the systems.

Mechanical Characterization Via Traction Tests of the Cross-Linked Polymer Network N7 Before and after Recycling Dog-bone shape samples of the cross-linked polymer network N7 were tested on a Instron 5064 traction machine. The samples were elongated to rupture with a speed of 1.5 mm/min, ground into powder and reprocessed via compression molding under a pressure of 3-5 tons for 1 hour at 150° C. This procedure was repeated 3 times on 4-6 samples.

Figure 5:
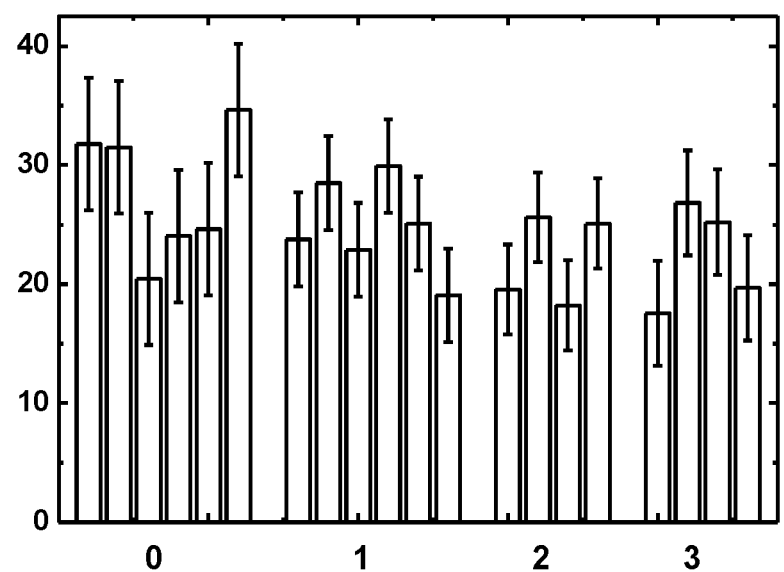
FIG. 5. Stress at break (ordinate, MPa) for the samples of the cross-linked polymer network N7 not recycled (abscissa, 0), for the samples of the cross-linked polymer network N7 recycled 1 time (abscissa, 1), for the samples of the cross-linked polymer network N7 recycled 2 times (abscissa, 2), for the samples of the cross-linked polymer network N7 recycled 3 times (abscissa, 3).

FIG. 5 represents the stress at break (ordinate, MPa) for the samples of the cross-linked polymer network N7 not recycled (abscissa, 0), for the samples of the cross-linked polymer network N7 recycled 1 time (abscissa, 1), for the samples of the cross-linked polymer network N7 recycled 2 times (abscissa, 2), for the samples of the cross-linked polymer network N7 recycled 3 times (abscissa, 3). These analysis indicate that the stress at break of the cross-linked polymer network N7 does not decrease significantly after several recycling cycles.

Figure 6:
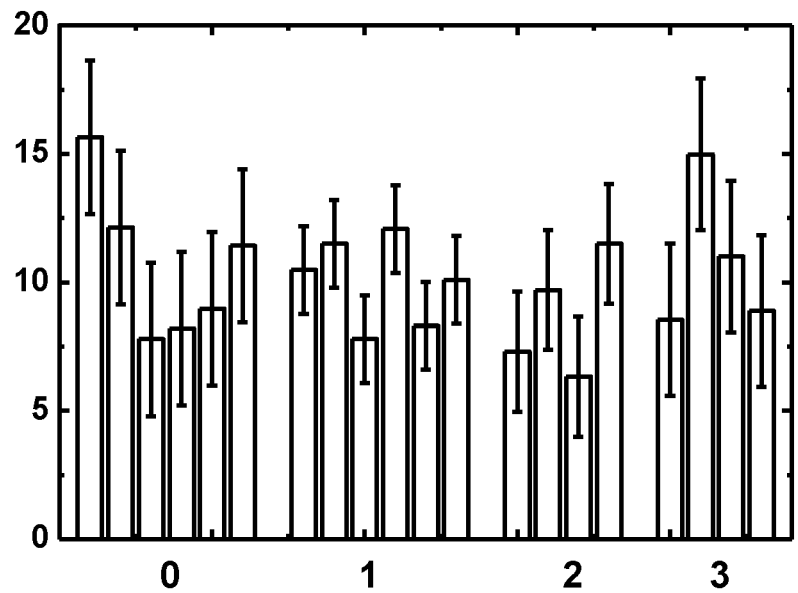
FIG. 6. Elongation at break (ordinate, %) for the samples of the cross-linked polymer network N7 not recycled (abscissa, 0), for the samples of the cross-linked polymer network N7 recycled 1 time (abscissa, 1), for the samples of the cross-linked polymer network N7 recycled 2 times (abscissa, 2), for the samples of the cross-linked polymer network N7 recycled 3 times (abscissa, 3).

FIG. 6 represents the elongation at break (ordinate, %) for the samples of the cross-linked polymer network N7 not recycled (abscissa, 0), for the samples of the cross-linked polymer network N7 recycled 1 time (abscissa, 1), for the samples of the cross-linked polymer network N7 recycled 2 times (abscissa, 2), for the samples of the cross-linked polymer network N7 recycled 3 times (abscissa, 3). These analysis indicate that the elongation at break of the cross-linked polymer network N7 does not decrease significantly after several recycling cycles.

<<Degradability>> Tests of the Cross-Linked Polymer Network N7 after Processing Via Compression Molding and after 4 Cycles of Processing Via Compression Molding/Mechanical Testing/Grinding into Powder The following example illustrates the ability of the cross-linked polymer network according to the invention to be degraded even after 4 cycles of compression molding/mechanical testing/grinding to powder.

Samples of the cross-linked polymer network N7 1$^{st}$ and 4$^{th}$ generation were "degraded" following the procedure described in D.1.

The samples of the cross-linked polymer network N7 1$^{st}$ and 4$^{th}$ generation were completely dissolved and the resulting polymers after "degradation" were characterized via size exclusion chromatography (eluent THF; PMM calibration).

The polymer obtained after degradation of the cross-linked polymer network N7 1$^{st}$ generation (processed via compression molding 1 time) presented a molar mass of $M_n$ de 95 000 g/mol and a dispersity Đ of 1.47.

The polymer obtained after degradation of the cross-linked polymer network N7 4th generation (processed via compression molding 4 times) presented a molar mass of $M_n$ de 91 000 g/mol and a dispersity Đ of 1.58.

These results indicate that the cross-linked polymer network N7 can be completely degraded even after 4 cycles of processing via compression molding/mechanical testing. Furthermore, the characterization of the polymers after degradation indicates that the polymer chains that constitute the material did not suffer, during the different steps of processing, recycling and mechanical testing, from side reactions that significantly modified their molar mass and dispersity.

Creep Tests of the Cross-Linked Polymer Network N7 Processed Via Compression Molding, after 2 and 3 Recycling Cycles The following example illustrates the possibility to reshape the cross-linked polymer networks described in the invention after processing via compression molding, after 2 and after 3 recycling cycles.

Samples of the cross-linked polymer network N7, $1^{st}$, $3^{rd}$ and $4^{th}$ generation (processed 1 time, recycled 2 times, recycled 3 times, respectively) were tested in creep experiments via dynamic mechanical analysis in a TA Q800 instrument. Rectangular samples were put under a constant stress of 0.013 MPa at 160° C. for 200 and 300 minutes. After 200 minutes, respectively 300 minutes, the stress was released and the samples were kept at 160° C. for 200 minutes, 100 minutes respectively.

Figure 7:
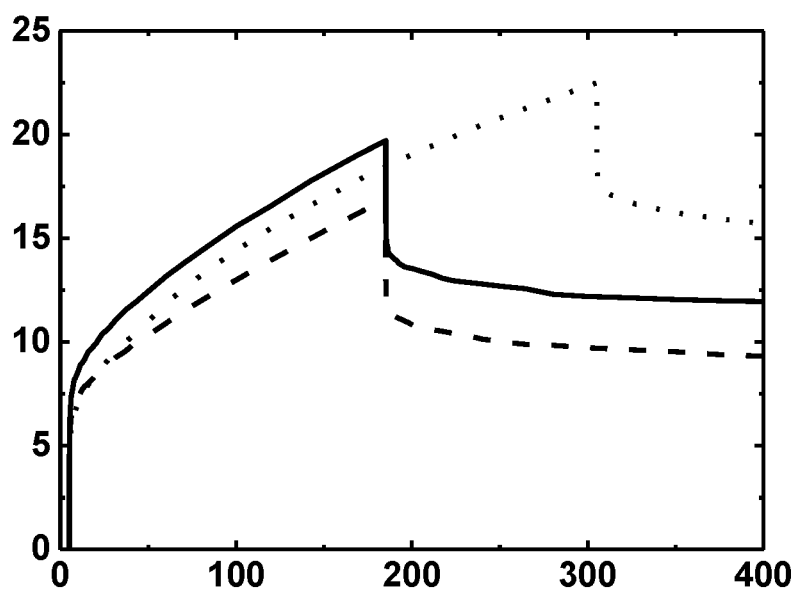
FIG. 7. Deformation, (ordinate, %) as a function of time (abscissa, min) of non recycled samples of the cross-linked polymer network N7 ($1^{st}$ generation, line), 2 times recycled samples of cross-linked polymer network N7 (3rd generation, dashed line), and 3 times recycled samples of the cross-linked polymer network N7 (4th generation, dotted line).

FIG. 7 represents the deformation, (ordinate, %) as a function of (abscissa, min) of non recycled samples of the cross-linked polymer network N7 ($1^{st}$ generation, line), 2 times recycled samples of cross-linked polymer network N7 (3rd generation, dashed line), and 3 times recycled samples of the cross-linked polymer network N7 (4th generation, dotted line).

These experiments indicate that the cross-linked polymer network N7 flow at 160° C. and that the speed of deformation does not change significantly after several cycles of processing via compression molding/recycling. These experiments indicate also that after release of the stress the samples show a permanent deformation of several % which correspond to their new shape of equilibrium. It is thus possible to reshape the cross-linked non recycled polymer network N7, the 2 times recycled and 3 times recycled polymer network N7.

Stress Relaxation Tests of Cross-Linked Polymer Networks

The following examples illustrate the capacity of the cross-linked polymer networks of the invention to totally or partially relax the stresses present in the material at a temperature greater than the glass transition temperature (Tg) or fusion (Tf), advantageously greater than Tg or Tf+10° C., more advantageously greater than Tg or Tf+20° C., even more advantageously greater than Tg or Tf+40° C., even more advantageously greater than Tg or Tf+80° C., if the glass transition temperature or the fusion temperature is lower than 25° C.

The stress relaxation experiments were performed in an Ares G2 rheometer with parallel plates geometry with a diameter of 25 mm. The rheometer is heated to 150° C. and equilibrated for 5 minutes. The samples are placed between the plates, equilibrated for 5 minutes and a normal force of 10-15 N is applied. After 5 minutes, a deformation of 3% is applied and the evolution of the stress as a function of time is monitored.

Figure 8:
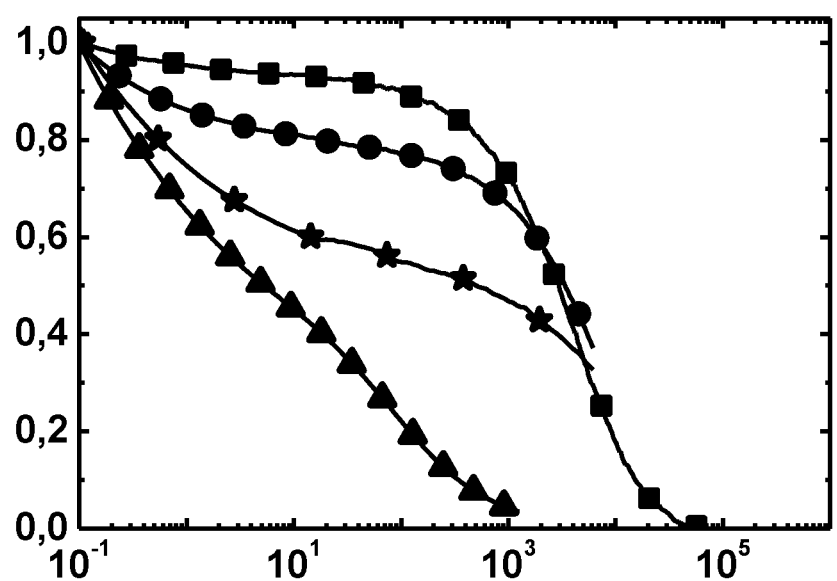
FIG. 8. Shear relaxation modulus normalized by the initial modulus at t=0 (ordinate, without unit) as a function of time (abscissa, seconds) of the samples of the cross-linked polymer networks N1 (square), of the samples of the cross-linked polymer networks N4 (triangle), of the samples of the cross-linked polymer networks N5 (cycle) and of the samples of the cross-linked polymer networks N6 (star).

FIG. 8 represents the shear relaxation modulus normalized by the initial modulus at t=0 (ordinate, without unit) as a function of time (abscissa, seconds) of the samples of the cross-linked polymer networks N1 (square), of the samples of the cross-linked polymer networks N4 (triangle), of the samples of the cross-linked polymer networks N5 (cycle) and of the samples of the cross-linked polymer networks N6 (star).

These experiments indicate that the cross-linked polymer networks of the invention can totally or partially relax stress present in the material at a temperature higher than the glass transition temperature of the polymers.

E. Processing Via Extrusion of a Cross-Linked Polymer Network Containing Pending Bonds Exchangeable Via Imine-Imine and/or Aldehyde-Imine Exchange Reactions The following example illustrates the possibility to process via extrusion the cross-linked polymer networks of the invention.

3.2 g of the cross-linked polymer network N8 are introduced in the bivis DSM micro 5 cc extrusion machine. Extrusion is performed at 200° C. with a rotational screw speed of 60 round per minute, a time of injection of 4 minutes and a time of circulation of 11 minutes. After injection of the total amount of the cross-linked polymer network, the force measured by the screws reaches a plateau of 3200 N. In total, 2.5 g of the cross-linked polymer network were extruded.

F. Attempt to Process a Cross-Linked Poly(Methyl Methacrylate) Network Containing Pending Aldehyde Functionalities but No Exchangeable Imine Functionalities The experiment presented below shows that cross-linked poly(methyl methacrylate) networks containing pending aldehyde functionalities but no exchangeable imine functionalities in their cross-links cannot be processed by compression molding techniques like the cross-linked polymer networks described in the invention.

A cross-linked PMMA network containing pending aldehyde functionalities but non-exchangeable cross-links, e.g. hexanediol dimethacrylate, was synthesized according to the procedure described below.

Methyl methacrylate (MMA) (4.0 g, 40.0 mmol), the aldehyde monomer C (2.38 g, 10.0 mmol) and hexanediol dimethacrylate (81.4 mg, 0.32 mmol) are mixed in a glass vial equipped with a septum. The solution is bubbled with nitrogen for 10 minutes at 65° C. before successive additions of a degassed solution of AIBN (13.1 mg, 0.08 mmol) in anisole (1.2 mL) and of a degassed solution of 2-phenyl 2-propyl benzodithioate (PPBDT) (54.5 mg, 0.2 mmol) in anisole (1.2 mL). The resulting reaction mixture is stirred at 65° C. for 24 hours. The polymerization is stopped by placing the polymer in 150 mL of anhydrous tetrahydrofuran for 16 hours before filtration. This swelling/filtration procedure is repeated a second time (9 hours) and the polymer is dried under high vacuum at 100° C. for 18 hours.

The resulting cross-linked polymer network is ground into powder and processed via compression molding. To do so, the powder is placed in a mould for 3 hours at 150° C. under a pressure of 3-6 tons. Via this procedure, a very crumbly and fragile material that breaks immediately when manipulated is obtained. This material is not transparent and the grains of the powder initially introduced into the mold are still visible.

The invention claimed is:

1. A composition comprising:
   (a) cross-linked polymers containing pending links and cross-links exchangeable by aldehyde-imine exchange reactions, imine-imine exchange reactions or aldehyde-imine and imine-imine exchange reactions, wherein the polymers, before cross-linking, are linear or branched polymers with side groups carrying:
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom; and
(b) free monofunctional aldehydes, free monofunctional imines, or both.

2. The composition according to claim 1, wherein the linear or branched polymers contain less than 0.5 mmol of primary amine and primary ammonium functions per gram of polymer before cross-linking.

3. The composition according to claim 1, wherein it comprises aldehydes and that a molar fraction of at least 1% of the aldehyde functions are aromatic aldehydes.

4. A composition according to claim 1, that arises from the mixture, in the molten state or in solution, of:
of at least one linear or branched polymer P1 with side-groups carrying:
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom; and
of at least one additive carrying at least two functional groups, chosen from imine, aldehyde or both, that are capable of reacting with the side-groups of the polymer P1 to form a cross-linked polymer composition with links and cross-links exchangeable by aldehyde-imine exchange reactions, imine-imine exchange reactions or aldehyde-imine and imine-imine exchange reactions.

5. The composition according to claim 4, wherein free monofunctional aldehyde is also added in the mixture.

6. The composition according to claim 4 in which the additive is chosen from
a compound of formula (I) below:

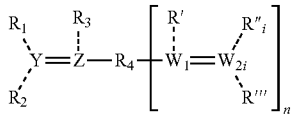

in which
n is a whole number between 1 and 6;
i is a whole number between 1 and n;
the dashed bond is present or absent, depending on the valence of Y, Z, $W_1$ and $W_2$;
Y and Z are different, and each represents either C or N; or Y is O and Z is C;
when Y represents C, Z represents N and $R_1$ represents a hydrocarbon group, $R_2$ represents H and $R_3$ is absent;
when Y represents N, Z represents C and $R_1$ represents H or a hydrocarbon group, $R_2$ is absent and $R_3$ represents H;
when Y represents O, Z represents C and $R_1$ and $R_2$ are absent and $R_3$ represents H;
$R_4$ represents a hydrocarbon group linked to the imine and/or aldehyde functions by a covalent bond through a carbon atom;
in each block $W_1(R')=W_{2i}(R''_i)(R''')$,
$W_1$ and $W_{2i}$ are different, and each represents either C or N; or $W_{2i}$ is O and $W_1$ is C;
when $W_{2i}$ represents C, $W_1$ represents N and R' is absent, $R''_i$ represents a hydrocarbon group and R''' represents H;
when $W_{2i}$ represents N, $W_1$ represents C and R' represents H, $R''_i$ represents H or a hydrocarbon group and R''' is absent;
when $W_{2i}$ represents O, $W_1$ represents C and $R''_i$ and R''' are absent and R' represents H;
when Z represents C, $W_1$ represents C;
when Y represents C, $W_{2i}$ represents
a linear or branched polymer P2 carrying:
aldehyde functional groups; or
imine functional groups linked to the polymer by the carbon atom; or
imine functional groups linked to the polymer by the nitrogen atom; or
aldehyde functional groups and imine functional groups linked to the polymer by the carbon atom; and
mixtures thereof.

7. The composition according to claim 6, in which the imine functions in polymer P1 are linked to the main chain through their carbon atoms and the additive is chosen from among: a polymer P2 in which the imine functions are linked to the main chain through their nitrogen atoms, or a compound of formula (I) in which the atoms Z and $W_1$ represent N.

8. The composition according to claim 6, in which the imine functions in polymer P1 are linked to the main chain through their nitrogen atoms and the additive is chosen from among: a polymer P2 in which the imine functions are linked to the main chain through their carbon atoms, a polymer P2 in which the side groups carry aldehyde functions, a polymer P2 comprising aldehyde functional groups and imine functional groups linked to the main chain through the carbon atom, or a compound of formula (I) in which the atoms Z and $W_1$ represent C.

9. The composition according to claim 1 that arises from the mixture, in the molten state or in solution, of:
of at least one linear or branched polymer P1' containing functions enabling grafting,
a combination of molecules of which the molecules comprise at one end a functional group enabling covalent binding of the molecule to the polymer P1' and at the other end a functional group chosen from among an imine function linked by its carbon atom, an imine function linked by its nitrogen atom, or an aldehyde function, and/or molecules comprising at two of their extremities functional groups enabling covalent binding of the molecule to the polymer P1' and between these two extremities an imine function, the combination enabling grafting and the creation of pending links and cross-links exchangeable by aldehyde-imine exchange reactions, imine-imine exchange reactions or aldehyde-imine and imine-imine exchange reactions.

10. The composition according to claim 9, wherein free monofunctional aldehyde is also added in the mixture.

11. The composition according to claim 1, wherein the aldehyde is a molecule in which the aldehyde function is carried by an aryl or heteroaryl group or the alkene function of a terpenoid.

12. The composition according to claim 1, in which the polymer is chosen from vinyl polymers, polyolefins, polyamides, and polysaccharides.

13. A process for preparing a cross-linked polymer composition, said process including the following steps:
choosing a linear or branched polymer P1 with sidegroups carrying:
aldehyde functional groups; or
imine functional groups linked to the polymer by the carbon atom; or
imine functional groups linked to the polymer by the carbon atom; or
aldehyde functional groups and imine functional groups linked to the polymer by the carbon atom;
choosing at least one additive carrying at least two functional groups, chosen from imine, aldehyde or both, that are capable of reacting with the side groups of the polymer P1 to form a cross-linked polymer composition containing links and cross-links exchangeable by aldehyde-imine exchange reactions, imine-imine exchange reactions or aldehyde-imine and imine-imine exchange reactions;
mixing, in the molten state or in solution, said polymer P1, said additive to obtain the said composition.

14. The process of claim 13, wherein a free monofunctional aldehyde is further added at the mixing step.

15. A process for preparing a cross-linked polymer composition, said process including the following steps:
choosing a linear or branched polymer P1' containing functions enabling grafting;
choosing a combination of molecules of which the molecules comprise at one end a functional group enabling covalent binding of the molecule to the polymer P1' and at the other end a functional group chosen from among an imine function linked by its carbon atom, an imine function linked by its nitrogen atom, or an aldehyde function, and/or molecules comprising at two of their extremities functional groups enabling covalent binding of the molecule to the polymer P1' and between these two extremities an imine function, the combination enabling grafting and the creation of pending links and cross-links exchangeable by aldehyde-imine exchange reactions, imine-imine exchange reactions or aldehyde-imine and imine-imine exchange reactions;
mixing, in the molten state or in solution, said polymer P1, said combination to obtain the said composition.

16. The process of claim 15, wherein a free monofunctional aldehyde is further added at the mixing step.

17. A method to catalyse imine-imine metathesis reactions and imine-aldehyde exchange reactions, comprising adding an aldehyde in a composition comprising imine-functionalized polymer.

18. A material obtained from the composition according to claim 1.

19. A formulation including a composition according to claim 1.

20. A method for preparing a composition comprising cross-linked polymers, preferably a cross-linked network, containing pending links and cross links exchangeable by aldehyde-imine exchange reactions, imine-imine exchange reactions or aldehyde-imine and imine-imine exchange reactions and free monofunctional aldehydes, imines or aldehydes and imines, comprising the addition of an additive, as defined in claim 6, or the combination such as defined in claim 9, to a composition comprising a linear or branched polymer P1 or P1'.

21. Combinations to cross-link linear or branched polymers, preferably P1 or P1', said combinations being chosen from among the combinations including:
free monofunctional aldehyde+compound of formula (I), as defined in claim 6;
free monofunctional aldehyde+polymer P2, as defined in claim 7;
A and/or B+C, and optionally a free monofunctional aldehyde as defined in one of the previous claims;
A and/or B and/or C+D, and optionally a free monofunctional aldehyde;
A and/or B+compound of formula (I) in which Z and $W_1$ are N, and optionally a free monofunctional aldehyde; or
C+compound of formula (I) in which Z and $W_1$ are a carbon atom, and optionally free monofunctional aldehyde;
A, B, C and D correspond to the following formulas: (A) $G_1$-Rx-CH=N-Ry, (B) $G_2$-R'x-CH=O, (C) $G_3$-R''y-N=CH—R''x and (D) $G_4$-R'''x-CH=N—R'''y-$G_5$ where the letters $G_1$, $G_2$, $G_3$, $G_4$ and $G_5$ represent a functional group enabling the molecules to be covalently linked to the polymer chain; Rx, R'x, R''x, R'''x and Ry, R''y and R'''y are hydrocarbon groups.

22. A method for preparing a composition comprising cross-linked polymers, preferably a cross-linked network, containing pending links and cross links exchangeable by aldehyde-imine exchange reactions, imine-imine exchange reactions or aldehyde-imine and imine-imine exchange reactions and free monofunctional aldehydes, imines or aldehydes and imines, comprising the addition of the combination as defined in claim 21, in the presence of a linear or branched polymer P1 or P1'.

23. The method of claim 22, for modifying the rheology of a composition, such as an oil or a paint, including the said polymer P1 or P1' by addition of said combination to the composition; the rheology is modified by choosing the concentration of the said combination.

24. The composition according to claim 2, wherein the composition contains less than 0.1 mmol of primary amine and primary ammonium functions per gram of polymer after cross-linking.

25. The composition according to claim 4, wherein the cross-linked polymer composition is a cross-linked network.

26. The composition according to claim 13, wherein the cross-linked polymer composition is a cross-linked network.

* * * * *